United States Patent
Beckett et al.

(10) Patent No.: US 9,684,673 B2
(45) Date of Patent: Jun. 20, 2017

(54) SYSTEMS AND METHODS FOR PROCESSING AND DISTRIBUTING EARTH OBSERVATION IMAGES

(71) Applicant: URTHECAST CORP., Vancouver (CA)

(72) Inventors: Keith Dennis Richard Beckett, New Westminister (CA); George Tyc, Delta (CA); Daniel Lopez, Oakland, CA (US); Nathan David Weisiger, San Francisco, CA (US); Stanley Erik Maciejewski, San Francisco, CA (US)

(73) Assignee: Urthecast Corp., Vancouver (CA)

( * ) Notice: Subject to any disclaimer, the term of this patent is extended or adjusted under 35 U.S.C. 154(b) by 0 days.

(21) Appl. No.: 15/101,344

(22) PCT Filed: Dec. 4, 2014

(86) PCT No.: PCT/US2014/068642
§ 371 (c)(1),
(2) Date: Jun. 2, 2016

(87) PCT Pub. No.: WO2015/112263
PCT Pub. Date: Jul. 30, 2015

(65) Prior Publication Data
US 2016/0300375 A1    Oct. 13, 2016

Related U.S. Application Data

(60) Provisional application No. 61/911,914, filed on Dec. 4, 2013.

(51) Int. Cl.
*G06F 17/30* (2006.01)
*G06T 3/40* (2006.01)
(Continued)

(52) U.S. Cl.
CPC .... *G06F 17/30241* (2013.01); *G06F 17/3028* (2013.01); *G06F 17/3084* (2013.01);
(Continued)

(58) Field of Classification Search
CPC ................ G06F 17/3087; G01C 21/32; G09G 2340/145
See application file for complete search history.

(56) References Cited

U.S. PATENT DOCUMENTS

| 7,158,878 B2 * | 1/2007 | Rasmussen | G01C 21/32 340/995.14 |
| 8,204,966 B1 * | 6/2012 | Mendis | G01C 21/32 707/706 |

(Continued)

*Primary Examiner* — Thomas Lett
(74) *Attorney, Agent, or Firm* — Seed IP Law Group LLP

(57) ABSTRACT

Systems and methods are provided for processing observation data. Processes and capabilities include: obtaining images and metadata associated with the images; encoding the images and the metadata to generate encoded tiles; storing the encoded tiles in an encoded tiles database; receiving a request for a map tile; searching the encoded tiles database and obtaining the encoded tiles that are relevant to the request; merging data from the encoded tiles into the map tile; and outputting the map tile. The images and metadata may be obtained from Earth observation platforms, including satellites or aircraft. The map tiles may include spectral content, data source identification, acquisition date/time, sensor characteristics, sun angles, calibration parameters, a cloud mask, a snow mask, a land mask, a water mask, and a missing data mask.

20 Claims, 18 Drawing Sheets

(51) Int. Cl.
  *G09B 29/00* (2006.01)
  *G06T 1/20* (2006.01)
  *G06T 1/60* (2006.01)
  *G06T 11/60* (2006.01)
  *G06K 9/00* (2006.01)

(52) U.S. Cl.
  CPC .. *G06F 17/30554* (2013.01); *G06F 17/30867* (2013.01); *G06K 9/0063* (2013.01); *G06T 1/20* (2013.01); *G06T 1/60* (2013.01); *G06T 3/4092* (2013.01); *G06T 11/60* (2013.01); *G09B 29/005* (2013.01); *G06T 2207/20021* (2013.01); *G06T 2207/30181* (2013.01)

(56) References Cited

U.S. PATENT DOCUMENTS

| | | | | |
|---|---|---|---|---|
| 2005/0270299 | A1* | 12/2005 | Rasmussen | G01C 21/32 345/552 |
| 2005/0288859 | A1* | 12/2005 | Golding | G01C 21/3602 701/438 |
| 2007/0080830 | A1* | 4/2007 | Sacks | G06F 3/147 340/995.1 |
| 2014/0344296 | A1* | 11/2014 | Chawathe | G06F 17/30241 707/755 |
| 2015/0379957 | A1* | 12/2015 | Roegelein | G09G 5/005 345/667 |

\* cited by examiner

SYSTEMS AND METHODS FOR PROCESSING AND DISTRIBUTING EARTH OBSERVATION IMAGES

TECHNICAL FIELD

The following relates generally to systems and methods for processing and distributing Earth observation imagery, and can be applied to observing other planetary objects.

BACKGROUND

Aerial imaging systems are becoming more popular as users wish to obtain images and video about the geography and landscape. For example, helicopters, airplanes and other aircraft are equipped with cameras to obtain aerial images of cities, forests, or other specific locations requested by a customer. Such systems are often limited to the flight time of the aircraft and the data is often very specific to a customer's request (e.g. surveying forests for forest fires, surveying a city for roads, or surveying land to inspect power lines).

Some satellite spacecraft are equipped with cameras to obtain imagery of the Earth. The data is sent from the satellite to a ground station on Earth, and the images are processed and sent to the customer. Satellites typically acquire a select or limited number of images targeting very specific areas of interest and at very specific times, as requested by a specific customer (e.g. weather companies, land development companies, security and defense organizations, insurance companies etc.). The relevancy of the acquired images may be difficult to understand. Often, little or no context of the images is provided.

BRIEF DESCRIPTION OF THE DRAWINGS

Embodiments will now be described by way of example only with reference to the appended drawings wherein.

DETAILED DESCRIPTION

Figure 1:
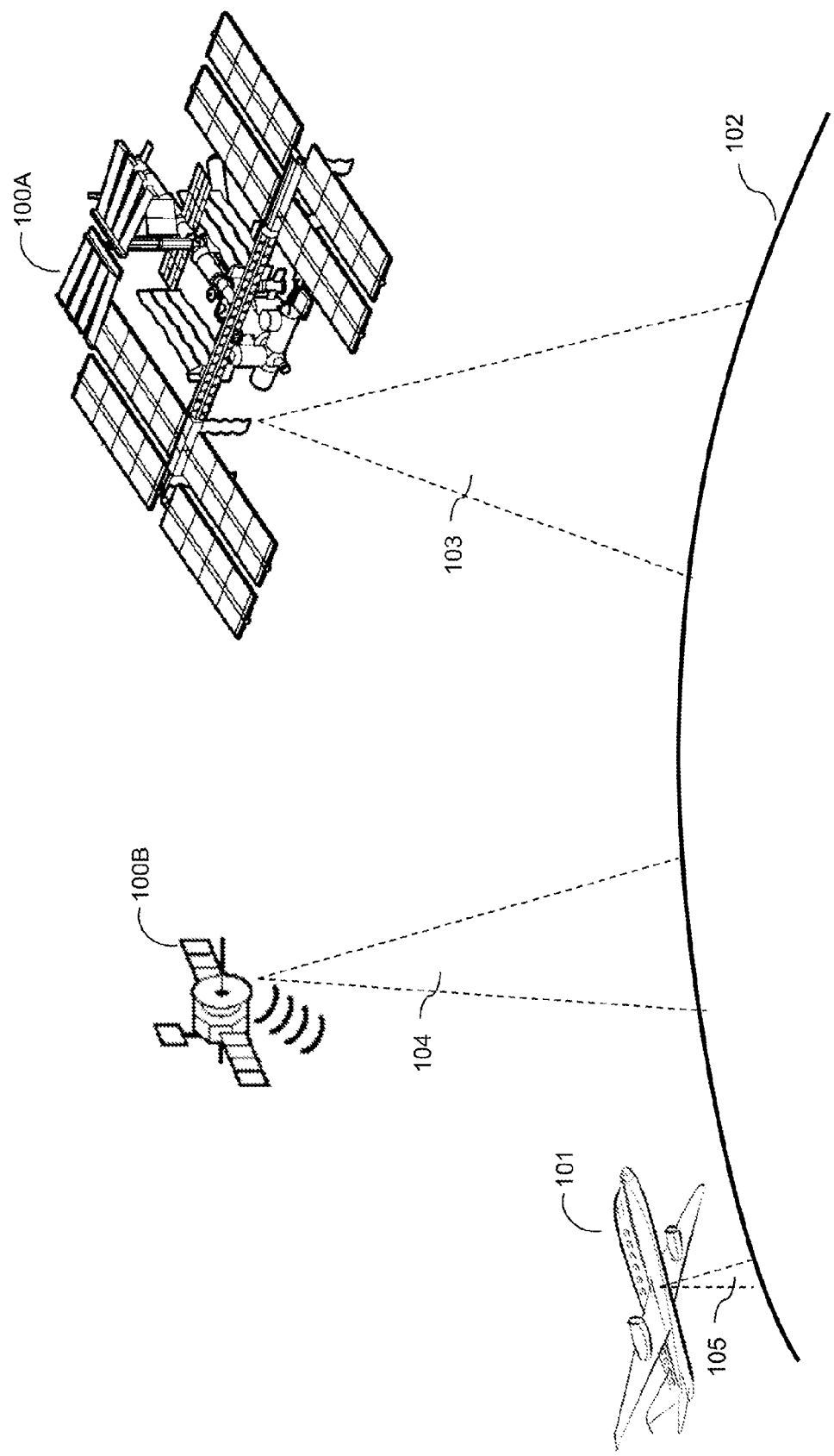
FIG. 1 is an illustration of spacecraft and aircraft collecting observation data of the Earth.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is recognized herein that there are a growing number of users who wish to consume or view imagery of the Earth, and that the users may vary. Non-limiting examples of users include the general public, consumer companies, advertising companies, social data networks, governments, security organizations, shipping companies, environmental companies, forestry organizations, insurance companies, etc. Providing images to these different types of users can be difficult in terms of acquiring the images and in terms of distributing the images.

It is also recognized that images from a single image provider may not be sufficient to meet the requests of customers, and that additional imagery data from other providers may be advantageous.

It is also recognized herein that even acquiring imagery data in an efficient manner, distributing the imagery data over computer networks, and storing the imagery data in memory to be searched later in a meaningful way, can be difficult.

It is further recognized herein that standard RGB (Red, Green, Blue) and panchromatic map tiles do not have spectral content, rich meta data and auxiliary information. As a result, Earth observation images (or other planetary images) typically do not include contextual data, or do not include sufficient contextual data, in which to interpret and understand the relevancy of the images. Standard or conventional map tiles include, for example, those map tiles defined by the Open Geospatial Consortium (OGC).

The systems and methods proposed herein address one or more of the above issues.

In the systems and methods proposed herein, map tiles are provided that include spectral content, rich metadata (e.g. data source, acquisition date/time, sensor characteristics, sun angles, calibration parameters, etc.) and auxiliary information (e.g. cloud mask, snow mask, land/water mask, missing data mask, etc.). The spectral content, metadata and auxiliary information may be used to provide user-focused applications and experiences to users consuming the Earth or other planetary observation images. By bundling all of the spectral information available in remotely sensed imagery, together with the rich metadata and complete auxiliary information, a wide range of user-focused applications and experiences may be achieved.

For example, by including the NIR (Near Infrared) spectral content, together with the RGB spectral content, additional information such NDVI (Normalized Difference Vegetation Index) can thus be derived. An NDVI image conveys information such as vegetation vitality, which is significant to many users, far beyond the conventional information conveyed by an RGB image.

Another example is change detection, derived from a stack of images. It is possible, for example, to use the rich metadata and the auxiliary information to detect and exclude the differences related to imaging sensor, imaging geometry, illumination geometry and other "apparent differences" not related to changes in the scene content. By excluding these differences, actual changes in the scene content may be properly detected.

Furthermore, the above two examples may then be combined, allowing a user, via a computing device, to examine the change in vegetation vitality over time. For example, the desertification of major crop growing areas of the United States and China, or the reforestation efforts in Canada and Russia, are more easily detected by a computing system and observed by users.

Other examples of user-focused applications or experiences include determining other indices, producing false colour images, and applying image analysis techniques that are of interest to different scientific and industry applications.

In an example embodiment, the proposed systems and methods bundle or combine tiled remotely sensed imagery, together with additional spectral content, rich metadata and complete auxiliary data.

In another example embodiment, the proposed systems and methods derive applications and experiences from image tiles bundled with additional spectral content, rich metadata and complete auxiliary data. Specific applications include, but are not limited to, indices, such as the Normalized Difference Vegetation Index (NDVI), and other false colour images. Specific experiences include, but are not limited to, time-series, change detection, 3D reconstruction, super-resolution and seamless mosaics.

In another example embodiment, the proposed systems and methods combine higher-value applications/experiences from lower-value applications/experiences derived from tiles bundled with additional spectral content, rich metadata and complete auxiliary data. Specific examples include, but are not limited to, time-series and change detection of indices and other false colour images.

In an example embodiment, a map tile service platform (MTSP) is provided to make imagery available in the form of map tiles. However, by contrast to mapping technology that serves static tiles that are updated infrequently, the map tile service platform is configured to support tiles that are updated frequently (e.g. daily or multiple times a day) and may even be dynamically updated based on the context of the user or application viewing the map tiles. The map tile service platform includes two high level services: an Encoded Tile Service (ETS) and a Map Tile Service (MTS). The map tile service platform may also be known by the trade name UrtheTile Service Platform (UTSP). The Encoded Tile Service may also be known by the trade name UrtheTile Service. The map tile service platform may also be referred to as a tiling encoding and rendering platform.

The Encoded Tile Service, for example, ingests imagery and encodes the imagery in a form that's improves scalability and performance and may also reduce costs. The internal form of the ETS is a large image tile known as an Encoded Tile. The Encoded Tile may also be known by the trade name UrtheTile.

The Map Tile Service, for example, answers imagery and metadata requests related to source imagery. The MTS uses the imagery ingested by the ETS for improved scalability and performance. The MTS also merges data from multiple Encoded Tiles into a single Map Tile.

TERMINOLOGY

Below are some of the terms used in this document, as well as example meanings of such terms.

Encoded Tile: A file composed of N number of color bands compressed as images, N number of layer masks, and a text metadata file per band for each available zoom level. In an example embodiment, the compressed band image and masks are 1024 pixels by 1024 pixels, although other sizes may be used. Encoded tiles may be stored in a memory device or across multiple memory devices. In the example embodiment, the encoded tiles are stored in a cloud computing system. A non-limiting example embodiment of a cloud computing system is available under the trade name Simple Storage Service (S3) provided by Amazon.

Figure 18:
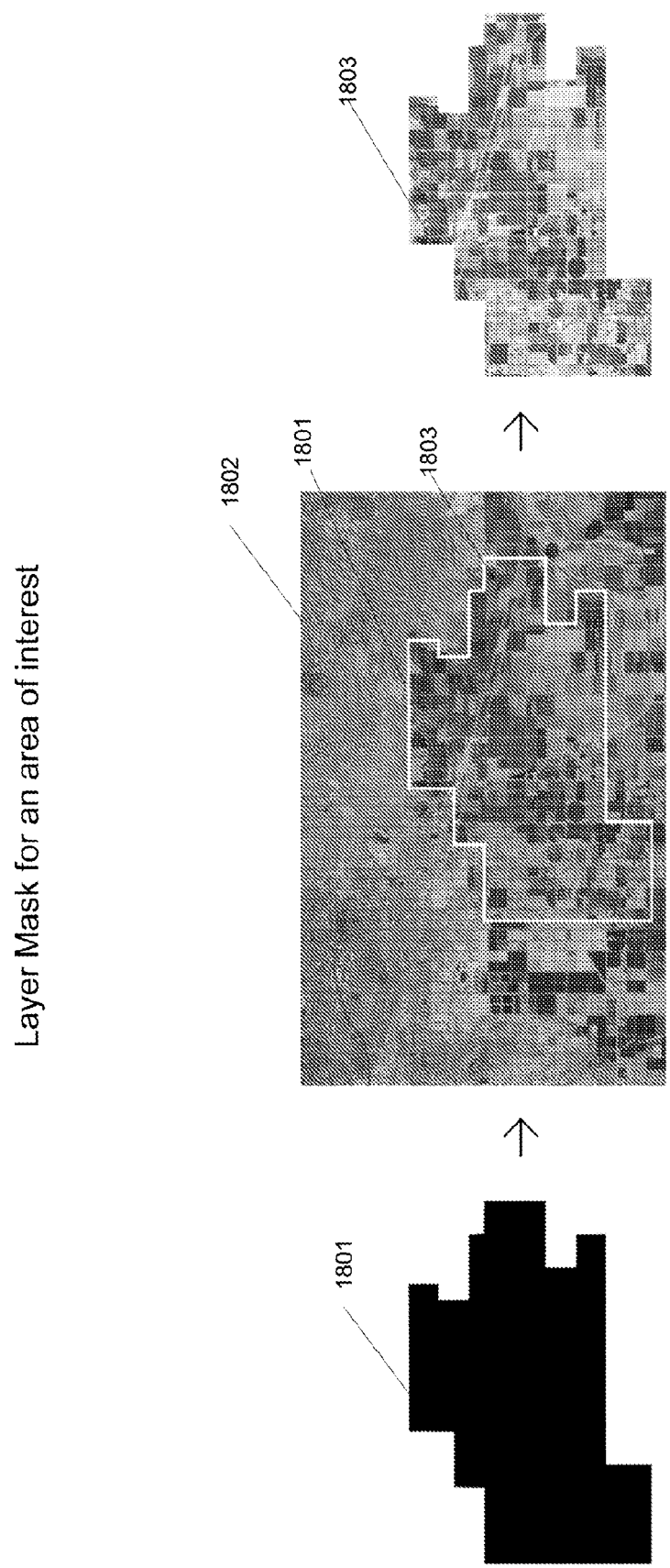
FIG. 18 is a diagram that describes what a layer mask is when selecting an area of interest with a specific polygon boundary.

Layer Mask: Using a bounding polygon to clip image tiles to a specific area of interest to provide context for vector layers within a map. The process is used to narrow the image processing to specific areas. FIG. 18, for example, shows a layer mask 1801 that is applied to a map 1802. The mask 1801 is a bounding polygon that defines an area of interest 1803 in the map 1802 and is used to clip and isolate the area of interest 1803.

Map Tile Service (MTS): The Map Tile Service is responsible for serving imagery and data products to external and internal clients, for example, as rasterized 256 by 256 pixels map tiles.

Encoded Tile Service (ETS): The encoded tile service is responsible for consuming imagery related notifications and producing the encoded tiles that will be consumed by the MTS and other services.

Scene: A scene is an object defining an area that shall be tiled. A scene contains metadata describing the location of the area to be tiled, and a link to an ortho (also called orthorectified imagery).

Ortho (or orthorectified imagery): An ortho refers to source imagery used by the ETS. This imagery has already been orthorectified and projected into a coordinate reference system. In an example embodiment, after the ETS sends a notification that tiling is complete, the ortho will be scheduled for deletion. By way of background, orthorectified imagery refers to imagery that has undergone an orthorectification process of correcting the geometry of the imagery so that it appears as though each pixel were acquired from directly overhead. Orthorectification uses elevation data to correct terrain distortion in aerial or satellite imagery.

In an example embodiment, the ETS accesses an ortho via a Network File System (NFS) mount point. It will be appreciated that other ways to access and obtain the ortho may be used. In another example embodiment, the orthorectified imagery is projected onto the coordinate reference system EPSG:3857. It will be appreciated that other coordinate reference systems may be used.

Map Tile: A map tile is an uncompressed image composed from any N number of encoded tiles and those masks associated with those encoded tiles.

Encoding: Encoding refers to the process where a scene is divided into a number of encoded tiles.

Merging: Merging refers to the process where any N number of encoded band and/or mask tiles are combined together and scaled to create a specific map tile. An example of merging tiles would be to loop through the required range of the encoded and/or masked tiles, reading in each tile, and pasting it into the map tile image. The encoded or makes tiles are pasted or added to the map tile image at specified coordinates. For example, each encoded or masked tile will be placed at the coordinates (X*tilesize, Y*tilesize) where X, Y ranges from zero to the number of tiles in X or Y direction. In an example embodiment, merging only is used when multiple scenes intersect the tile boundary.

Caching: Caching refers to the process where up-to-date map tiles are saved and re-sent to any other service that requested it, instead of re-merging encoded tiles to create the same looking map tile. This can be done via file or in-memory cache.

Scene Catalog: The scene catalog manages metadata of all imagery available within the system.

Messaging Bus (MB): The messaging bus routes imagery related notifications to and from the ETS.

Tile Client: The tile client is an external computing device that requests tile images and metadata from the MTS. Generally the client is implemented as part of an Internet browser-based application on a computing device. However, the client may also be implemented by an external computing device or system communicating, for example, via a REST API.

Content Delivery Network (CDN): The content delivery network is used for caching map tiles closer to end-users to expedite the download and rendering of content to an end user. Cloud computing systems or services may be used as a content delivery network. A non-limiting example of a content delivery network is available under the trade name CloudFront provided by Amazon Web Services.

Job Queue: Metadata about the scenes currently being processed are stored in the job queue. A job queue is defined as a framework for processing and messaging within distributed system architecture.

Data Partner Portal: The Data Partner Portal (DPP) is a Web based system for uploading, ingesting, and managing data from third parties Example Earth Observation System Turning to FIG. 1, example embodiments of various spacecraft 100A, 100B and an aircraft 101 are shown orbiting or flying over the Earth 102. The International Space Station 100A is an example of a spacecraft and it is able to use an imaging system to capture a field of view 103 of the Earth 102. Another spacecraft is a satellite 100B which can use an imaging system to capture a field of view 104 of the Earth 102. It can be appreciated that other types of spacecraft, including rockets, shuttles, satellites, microsatellites, nanosatellites, cubesats, and capsules, and generally spacecraft are herein generally referenced by the numeral 100. Aircraft 101, including airplanes, unmanned aerial vehicles (UAVs), helicopters, gliders, balloons, blimps, etc., can also be equipped with an imaging system to capture a field of view 105 of the Earth 102. It can also be appreciated that marine vehicles (e.g. boats, underwater vehicles, manned vehicles, unmanned vehicles, underwater or above-water drones, etc.) can also be equipped with sensing technology and this sensor data can be obtained, managed and processed using the principles described herein.

Although Earth is used as an example in this document, the principles described herein also apply to remote sensing operations for other planetary objects. Non-limiting examples include asteroids, meteors, Mars, the Moon, the Sun, etc.

It can be appreciated that spacecraft 100 and aircraft 101 orbit or fly at a distance above the Earth's surface to capture larger areas of the Earth's surface. It can also be appreciated that the principles described herein are described with respect to spacecraft, but the principles also apply to aircraft and other vehicles.

Figure 2:
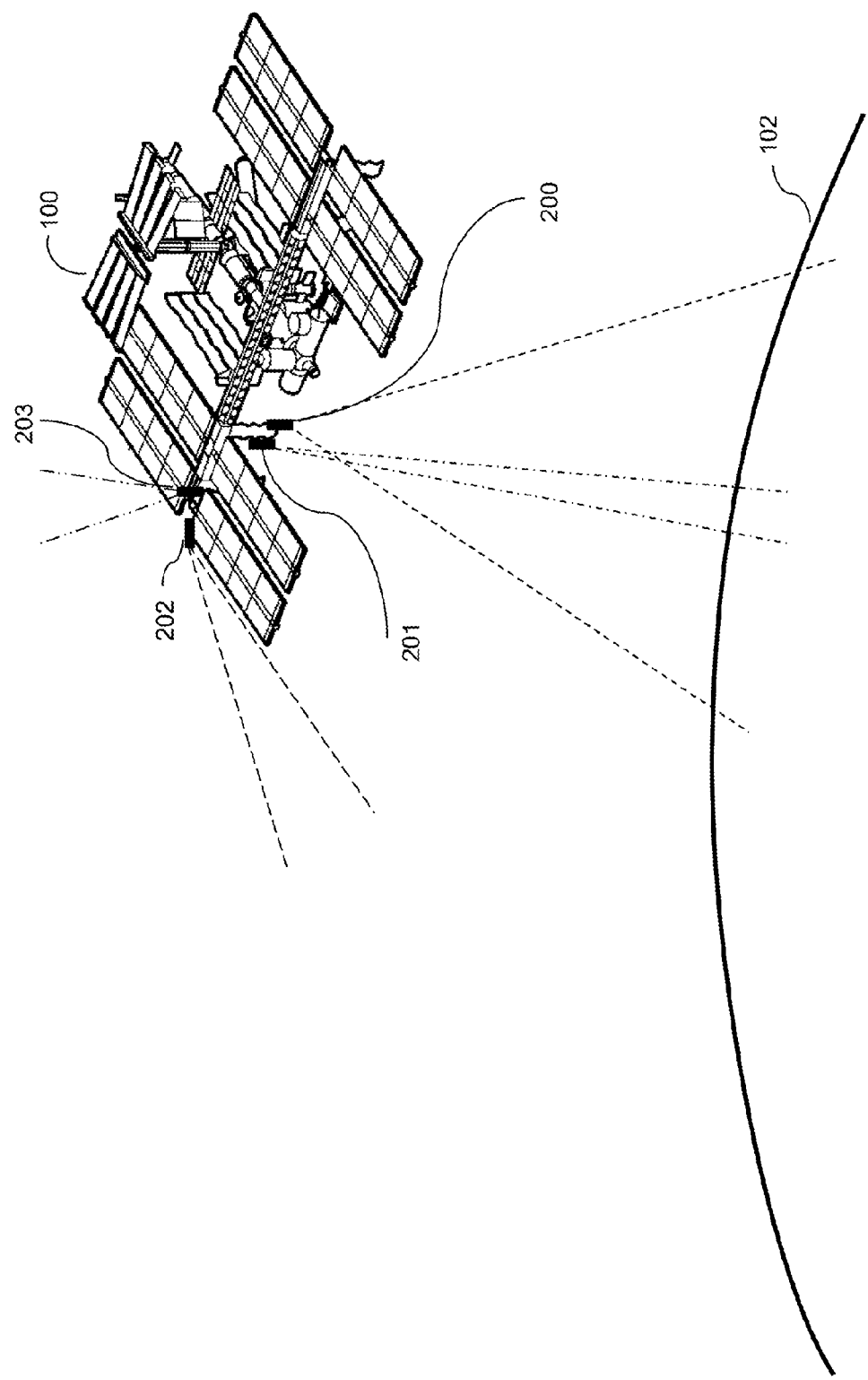
FIG. 2 is an illustration of the International Space Station using cameras to capture images of the Earth.

Turning to FIG. 2, an example embodiment of spacecraft 100 (e.g. the International Space Station, is equipped with several cameras. Cameras 200 and 201 are pointed towards the Earth's surface to capture images of the Earth's surface. In an example embodiment, camera 200 is a Medium Resolution Camera (MRC) that has a larger field of view and camera 201 is a High Resolution Camera (HRC) that has a smaller field of view relative to the MRC. The spacecraft is also equipped with a camera 202 that points towards the horizon of the Earth. Another camera 203 is mounted on the spacecraft to point towards space, away from the Earth. The camera 203 can capture images in the general opposite direction of cameras 200 and 201. For example, camera 203 can capture images of the stars in space.

It will be appreciated that although the principles described herein apply to aircraft and spacecraft, it is recognized that a spacecraft 100 is able to orbit the Earth. In other words, a spacecraft is able to cover vast distances of the Earth very quickly, compared to an aircraft, and the spacecraft is able to stay positioned above the Earth for extended periods of time, compared to the aircraft.

It will also be appreciated that although cameras and imaging systems are often described herein to observe the Earth, other types of sensors can be used to observe the Earth. Many of the principles described herein also apply to different types of sensors. Non-limiting examples of other types of sensors that can be used to observe the Earth include LiDAR, RADAR, infrared sensors, temperature sensors, radiometers, gravimeters, photometers, SONAR, seismograms, hyperspectral sensors and Synthetic Aperture RADAR (SAR). Other types of remote sensing technology also apply.

Figure 3:
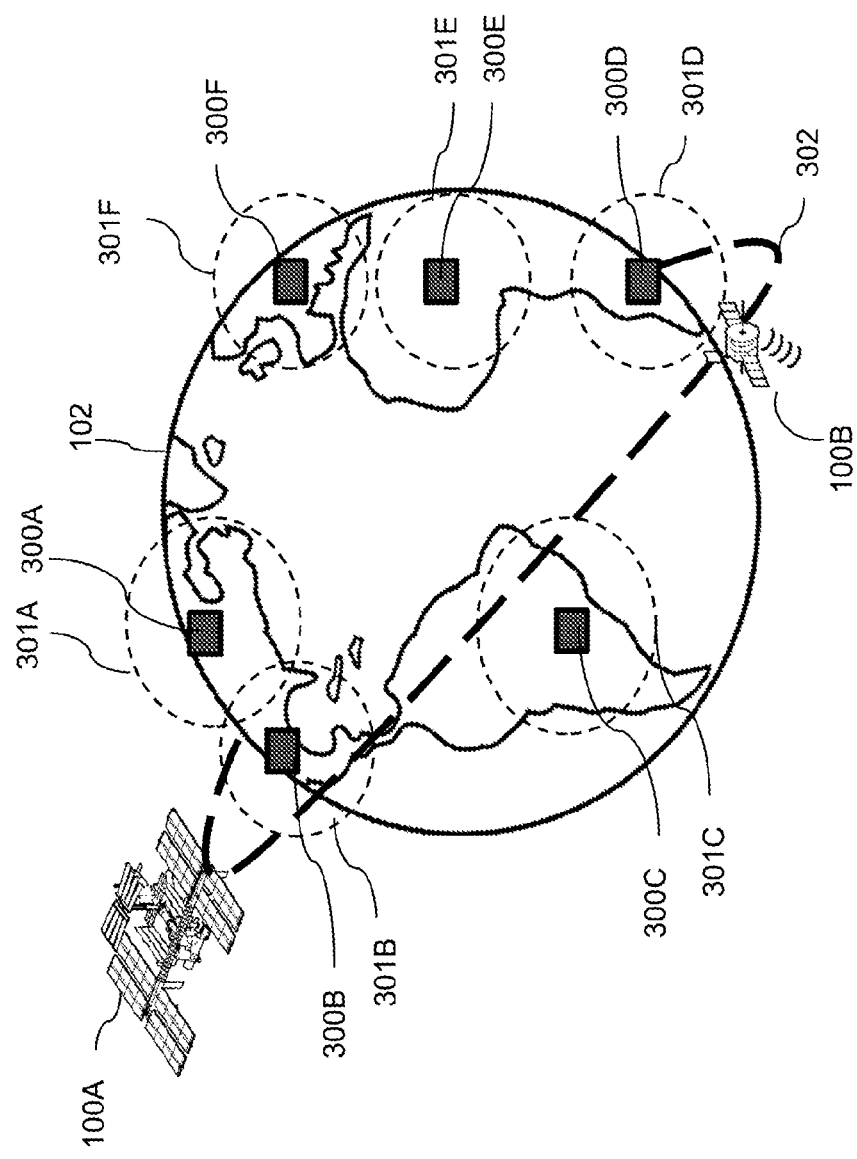
FIG. 3 is an example diagram of a spacecraft orbiting Earth and being in communication range with different ground stations.

Turning to FIG. 3, one or more spacecraft 100A, 100B are shown orbiting the Earth 102 along an example orbit path 302. More generally, the spacecraft 100 captures and stores data, such as image data, and wirelessly transmits the data to ground stations on the Earth. In an example embodiment, there are multiple ground stations 300A, 300B, 300C, 300D, 300E, 300F. It is noted that a ground station, generally referenced by the numeral 300, typically has to be within a certain position relative to the spacecraft 100 for data to be transmitted between the ground station and the spacecraft. The transmission regions of each of the ground stations is illustrated, for example, using the dotted circles 301A, 301B, 301C, 301D, 301E, 301F. It will be appreciated that when the spacecraft is within a range of a transmission region of a given ground station, the spacecraft and the given ground station are able to exchange data. For example, when the spacecraft 100 is within range of the transmission region 301B of the ground station 300B located in North America, the spacecraft and the ground station 300B can exchange data. As the area of a transmission region is limited, it is advantageous to have multiple ground stations located around the Earth so that the spacecraft can exchange data with different ground stations as the spacecraft orbits the Earth. For example, when the spacecraft moves to a position over South Africa and is within range of a local ground station 300D, the spacecraft can send or receive data from the ground station 300D. When the spacecraft is in range of the ground station 300D, the spacecraft may be out of range of the ground station 300B located in North America.

Figure 4:
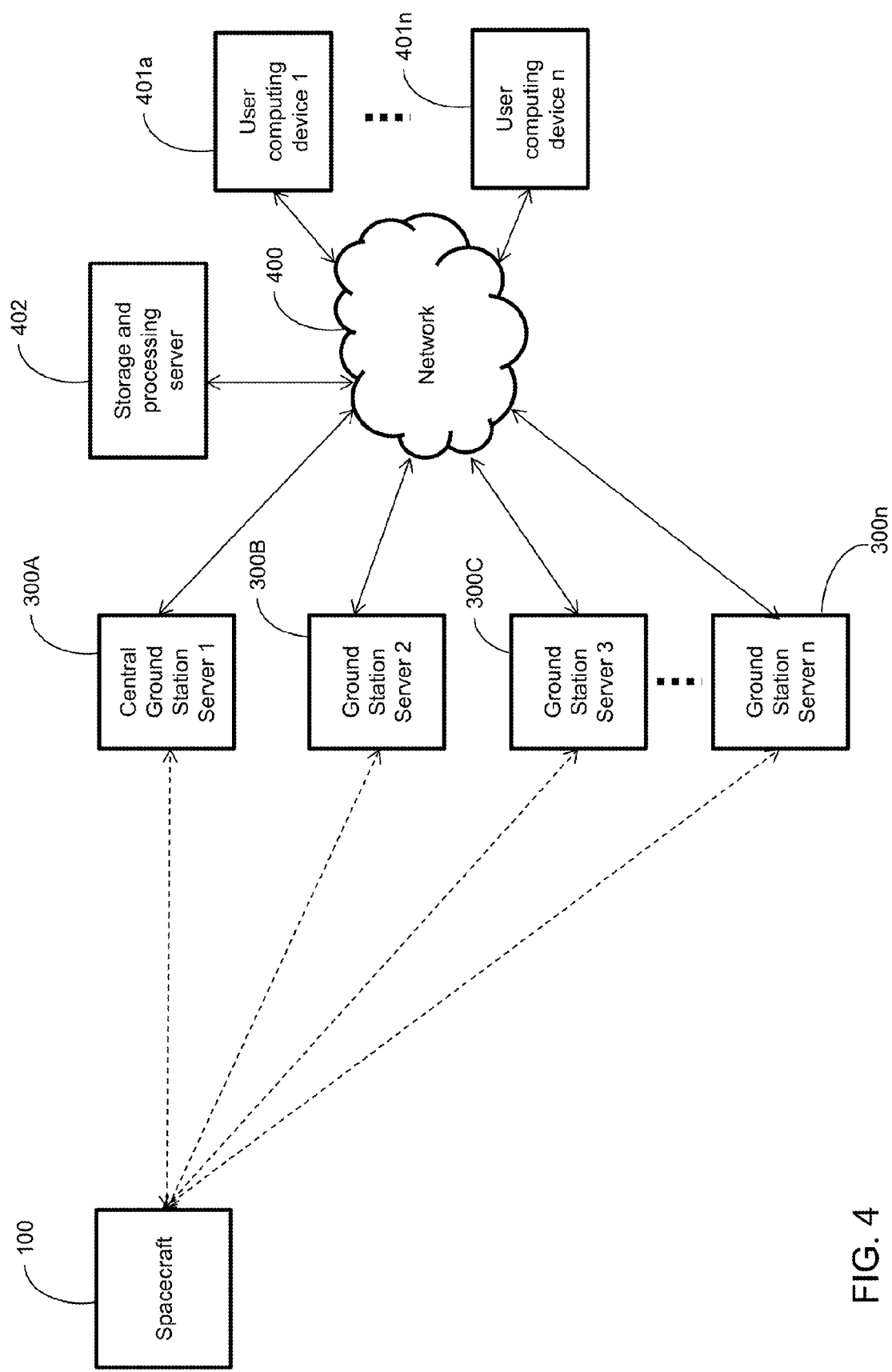
FIG. 4 is an example system showing the spacecraft, various ground stations, a server system, and user computing devices being in communication with each other.

In an example embodiment, the ground stations are in communication with each other. Turning to FIG. 4, an example embodiment of a network system is shown. The spacecraft 100 may communicate to one or more of the ground stations 300A, 300B, 300C, . . . , 300n at the same time or at different times. The ground stations are in communication with each other over a network 400. In an example embodiment, the ground stations include communication hardware (e.g. antennas, satellite receivers, etc.) to communicate with the spacecraft 100, computing devices (e.g. server systems) to store and process data, and communication hardware to communicate with the network 400. One of the ground stations 300A is a central ground station server which obtains the data from all the other ground stations. In an example embodiment, the central ground station stores and compiles all the data from the other ground stations together, and conducts the computing processes related to the data and any other data from external sources. In another example embodiment, another server 402 stores, compiles and processes the data from all the ground stations, including data from external sources. The other server 402 is not considered a ground station, but another server system. The network 400 may be wired network, a wireless network, or a combination of various currently known and future known network technologies. The network 400 may also be connected to the Internet or part of the Internet. User computing devices 401a, . . . , 401n are in communication with the network 400. Non-limiting examples of user computing devices include personal computers, laptops, mobile devices, smart phones, wearable computing devices, and tablets. Users can use these computing devices to upload data (e.g. request for data, additional imagery, etc.) via the network, and download data (e.g. raw imagery or processed imagery) via the network.

Figure 5:
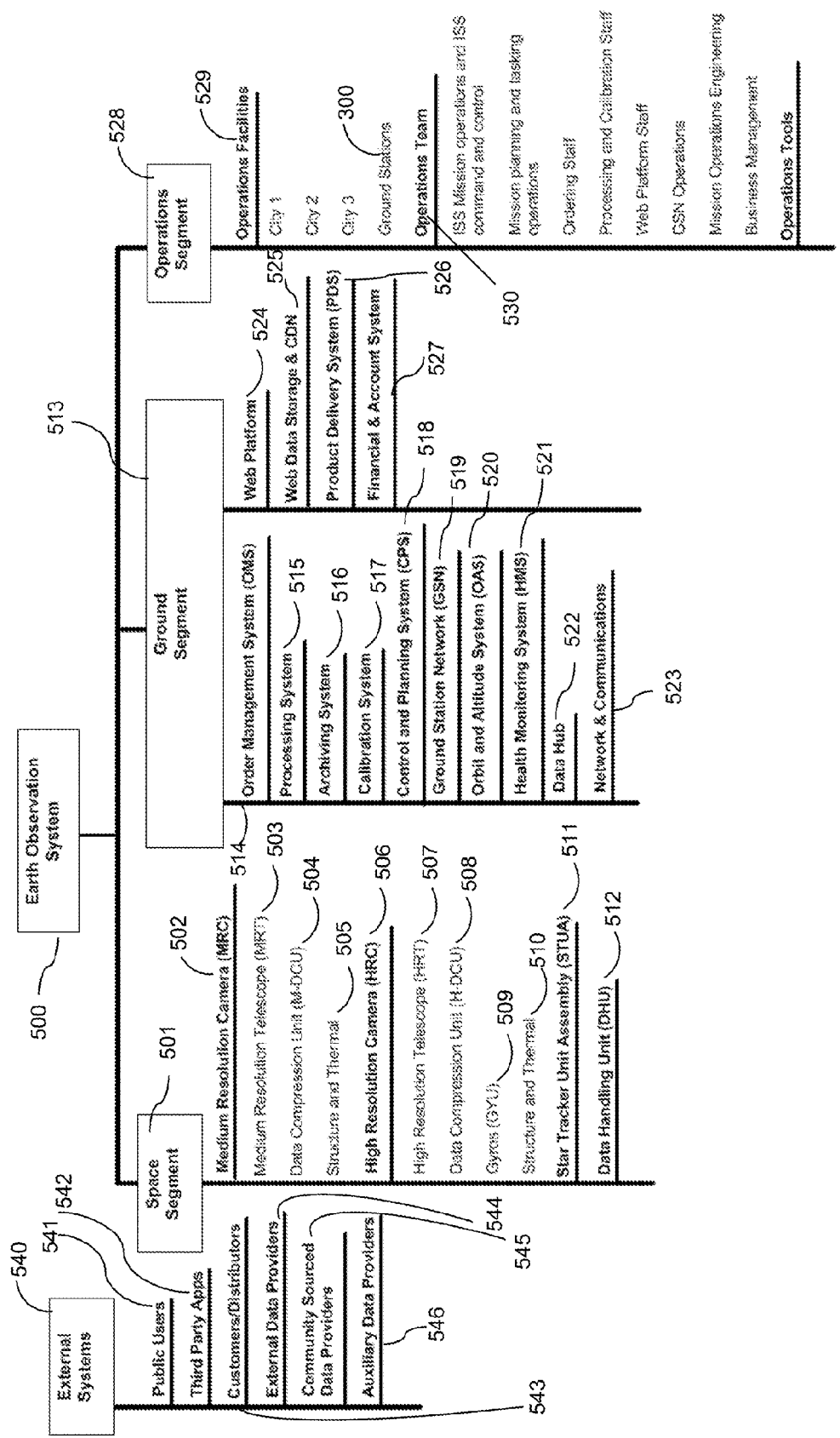
FIG. 5 is an example system decomposition of the Earth observation system showing example components.

FIG. 5 shows a decomposition of example components and modules of the Earth Observation System 500. The system 500 includes the following major components: the space segment 501, the ground segment 513 and the operation segment 528.

The space segment 501 includes a Medium Resolution Camera (MRC) 502. The MRC includes a Medium Resolution Telescope (MRT) 503, a data compression unit (M-DCU) 504, and structure and thermal components 505. The space segment also includes a High Resolution Camera (HRC) 506, which includes a High Resolution Telescope (HRT), a data compression unit (H-DCU) 508, gyroscopes (GYU) 509, and structure and thermal components 510. The space segment also includes a star tracker unit assembly (STUA) 511 and a Data Handling Unit (DHU) 512.

The ground segment 513 includes the following systems, components and modules: an order management system (OMS) 514, a processing system (PS) 515, an archiving system (AS) 516, a calibration system (CS) 517, a control and planning system (CPS) 518, a ground station network 519 (which comprises the ground stations 300 and the network 400), an orbit and attitude system (OAS) 520, a health monitoring system (HMS) 521, a data hub (DH) 522, network and communications 523, a Web platform 524, a Web data storage system and content delivery network (CDN) 525, a product delivery system (PDS) 526, and a financial and account system (FAS) 527. The systems, components and modules described in the ground segment are implanted using server systems and software modules.

The operation segment 528 includes operation facilities 529, which are located at different locations and at the ground stations 300, and an operations team 530.

The observation system 500 may also include or interact with external systems 540, such as public users 541, third party applications 542, customers and distributors 543, external data providers 544, community-sourced data providers 545, and auxiliary data providers 546.

More generally, the space segment 500 includes camera systems installed on the International Space Station (ISS), or some other spacecraft. For example, the MRC 502 provides a medium resolution swath image of the Earth that is approximately 50 km across. The HRC 506 captures true video data, for example, at approximately 3 frames/sec, having an area of approximately 5 km by 3.5 km for each image. Other cameras are mounted inside or outside the ISS looking out the windows.

Some high level operational scenarios are summarized below.

In an example operation scenario, the system acquires image and video data and makes it available on the Web Platform 524 (e.g. a Website or application accessed using the Internet). This includes ongoing collection and sufficient time to build up archives of a significant portion of the Earth. This involves very large data volumes. The benefits to users include constantly updating imagery. Image data is acquired to cover the accessible part of the Earth, with higher priority and quality given to areas of greater user interest. Image data, such as video data and high resolution imagery from the HRC, is acquired for specific areas of interest based on predictions from the system 500 and from input from users.

In another example operation scenario, the Web Platform 524 provides a user experience that incorporates continually refreshed and updated data. The system is able to publish the remote sensing data (e.g. imagery) to users in near real time. Users (e.g. public user 524) will be able to interact with the platform and schedule outdoor events around the time when they'll be viewable from our cameras. The Web Platform will also integrate currently known and future known social media platforms (e.g. Twitter, Facebook, Pinterest, etc.) allowing for a fully geo-located environment with Earth video content. In addition, the API will be open source, allowing developers to create their own educational, environmental, and commercially focused applications.

In another example operation scenario, customers and distributors interact with the systems to submit requests. Requests include Earth observation data (e.g. both existing and not-yet acquired data) and value added information services.

In another example operation scenario, an online platform is provided that incorporates components of various currently known and future known online stores (e.g. Amazon.com, the Apple AppStore, Facebook, etc.). The online platform or online store allows consumers to search and purchase software applications developed and uploaded by third party developers. The applications have access to the images obtained by the Earth observation system 500, including images obtained by external systems 540.

Figure 6:
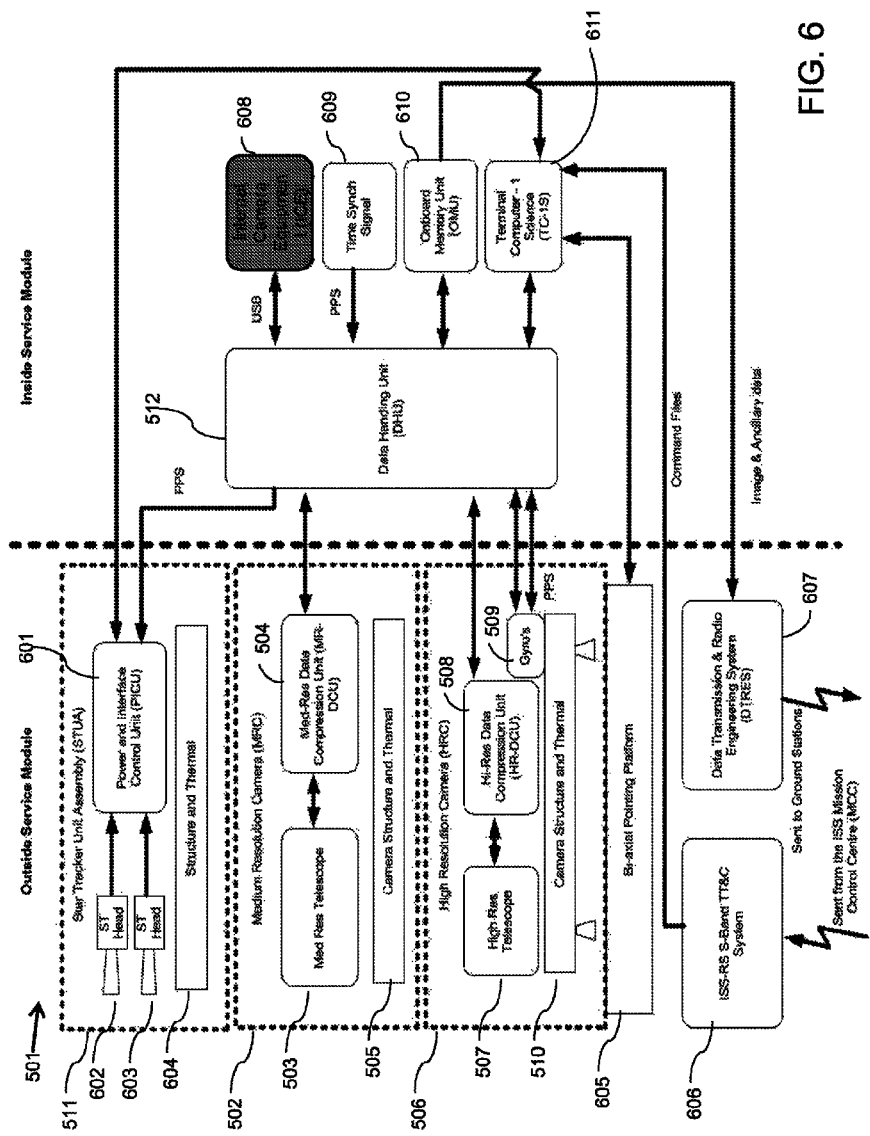
FIG. 6 is an example system diagram of the space segment.

Turning to FIG. 6, a system diagram shows example components of the space segment 501. The space segment includes imaging and computing equipment that is mounted to or part of a spacecraft 100, such as the ISS. The spacecraft provides the utilities of electrical power, downlink communications of data, pulse-per-second (PPS) signal and time messages for absolute time stamping, uplink of command files and software or configuration table uploads, 2-axis pointing of the HRC 506, and accommodations of equipment and cosmonaut installation of the equipment.

The space segment 501 includes the Biaxial Pointing Platform (BPP) 605, the On-board Memory Unit (OMU) 610, the TC1-S computer 611, the time synchronization signal generation 609, Internal Camera Equipment (ICE) 608, the Data Transmission Radio Engineering System (DTRES) 607 which is the X-band downlink transmitter, and the on-board S-band telemetry System 606 that is used to receive the command files and transmit real-time telemetry to the Mission Control Centre.

The TC1-S 611 is configured to receive a set of commands used for imaging and downlinking in an Operational Command File (OCF). OCFs are configured to be uplinked through the s-band telemetry system to the TC1-S 611. The TC1-S 611 checks the OCF and then sends the OCF to the DHU 512 which controls the cameras.

Image data, video data, ancillary data, telemetry data, and log data is collected by the Data Handling Unit 512 and then transferred to the OMU 610. This data is then transferred from the OMU 610 to the DTRES 607. The DTRES 607 downlinks this data to ground stations 300 around the Earth.

The Internal Camera Equipment (ICE) 608 would be used to provide imagery that is in addition to the MRC and HRC. The ICE includes, for example, a video camera pointed out of a viewing port to observe the earth's limb (e.g. camera 202), and a still-image camera would be pointed out a of different viewing port along nadir or as near to nadir as is possible. The cameras, for example, have a USB interface that can be used to get the data from the cameras into the DHU 512 to be subsequently downlinked. Certain components (e.g. 512, 608, 609, 610, 611) may be located inside the spacecraft 100 and other components may be located outside the spacecraft.

Continuing with FIG. 6, example details regarding the optical telescope system are described.

The main elements of the MRC 502 are the Medium Resolution Telescope (MRT) 503, which includes the focal plane and associated electronics, the Data Compression Unit (M-DCU) 504, the structure and thermal enclosure 505, and the corresponding cable harnesses and a connector box.

In an example embodiment, the MRT 503 is a fixed pointing 'push broom' imaging system with four linear CCD arrays providing images in four separate spectral bands. For example, the images will have a Ground Sampling Distance (GSD) of approximately 5.4 m×6.2 m and will cover a swath of 47.4 km (at 350 km altitude).

The data from the MRT 503 is fed into the M-DCU 504 which uses a compression process (e.g. JPEG2000 or JPEG2K) to compress the data stream in real-time and then transmit the compressed image data to the DHU. In addition to performing the data compression, the M-DCU 504 is also the main interface to the DHU 512 for controlling the camera. It gathers camera telemetry to be put into log files that are downlinked with the imagery, sets up the MRT 503 for each imaging session (e.g. sets the integration time), and performs the operational thermal control.

The MRC 502 is able to take continuous, or near continuous, images of the Earth, producing long image strips. The image strips will be segmented so that each segment has a given set of parameters (i.e., compression ratio and integration time). Each image strip segment, made up of all 4 spectral bands, is referred to as an "Image Take" (IT). In some cases, there may be a very small gap between Image Takes whenever a control parameter such as compression ratio or integration time is changed.

The imagery is divided into "frames", each of which are JPEG2000 compressed and downlinked as a stream of J2K files. Other compression protocols and data formats may be used.

In an example embodiment, the integration time is varied in a series of steps over the course of the orbit, adjusting for the solar illumination level, including night imaging. The compression ratio may also be varied over the course of the orbit, according to the scene content. Images of the land with reasonable solar illumination levels may be acquired with relatively low compression ratios, yielding high quality products. Images of the ocean and land with low solar illumination levels, and all images at night may be acquired with higher compression ratios with little perceptible losses since they have much lower spatially varying content.

An along-track separation of the bands can occur because the linear CCD arrays are mounted on a common focal plane, but spatially offset with respect to the camera bore sight. The image take data collected by the individual spectral bands of the MRC are acquired at the same time, but are not geo-spatially aligned. In a particular example, the NIR-band (leading band) will record a scene 6 to 7 seconds before the red-band (trailing band). This temporal separation will also cause a cross-track band-to-band separation due to the fact that the Earth has rotated during this period.

The along-track and cross-track band-to-band spatial and temporal separations in the image take data sets are typical of push broom image data collection, and will be compensated for by the image processing performed on the ground by the processing system 515 when making the multi-band image products.

Continuing with FIG. 6, elements of the HRC 506 are the High Resolution Telescope (HRT) 507, which includes the focal plane and associated electronics, the Data Compression Unit (H-DCU) 508, a 3-axis rate gyro system 509, the structure and thermal enclosure 510, and the corresponding cable harnesses and a connector box.

In an example embodiment, the HRT 507 is configured to produce full frame RGB video at a rate of 3 frames per second. Throughout the system, the HRT video data is largely treated as a time series of independent images, both by the HRC 506 and the processing system 515.

In an example embodiment, the HRT 507 is a large aperture reflective (i.e. uses mirrors) telescope which also includes a refractive element. The HRT also includes a Bayer filter and a two-dimensional, 14 Megapixel CMOS RGB imaging sensor on the focal plane. In an example embodiment, the image area on the ground is 5 km×3.3 km with a GSD of 1.1 m when the space craft is at an altitude of 350 km.

The data from the HRT 507 is fed into the HR-DCU 508 which compresses the data stream in real-time and then transmit the compressed image data to the DHU 512. In addition to performing the data compression, the DCU 508 is also the main interface to the DHU for controlling the camera. The DCU 508 gathers camera telemetry to be put into log files that are downlinked with the imagery, sets-up the HRT for each imaging session (e.g., sets the integration time), and performs the operational thermal control.

The imagery is divided into "frames", each of which are JPEG2000 compressed and downlinked as a stream of J2K files. Like the MRC, the integration time for the HRC will be appropriately selected for the solar illumination level, including night imaging. The compression ratio will also be selected, according to the scene content. Videos of the land with reasonable solar illumination levels will be acquired with relatively low compression ratios, yielding high quality products. Videos of the ocean and land with low solar illumination levels, and all videos at night will be acquired with higher compression ratios with little perceptible losses since they have much lower spatially varying content.

The HRC 506 is mounted to a two-axis steerable platform (e.g. the Biaxial Pointing Platform—BPP). The BPP 605 is capable of pointing the camera's bore sight at a fixed point on the ground and maintaining tracking of the ground target. For example, the BPP will rotate the camera to continuously point at the same target while the spacecraft is moving for approximately a few minutes. A 3-axis gyro system 509 is also included in the HRC 506 that measures the angular rates at high frequency. The system 509 sends this angular data to the DHU 512 to be downlinked as ancillary data. This angular data is used in the image processing on the ground to improve the image quality.

Collection of a single video over a selected ground target is referred to as a "Video Take" (VT). A ground target may be a single point where all frames are centered on this one point. A ground target, in another example embodiment, may be a 2D grid of points where a fixed number (e.g. 1-5) of frames is centered on each of the points in a serpentine sequence (resulting in a quilt-like pattern that covers a larger area). In another example, a ground target is a slowly varying series of points forming a ground track (following along a river, for example).

Continuing with FIG. 6, the DHU 512 is configured to control the MRC 502 and HRC 506 via their associated DCUs 504, 508. The DHU 512 configures and controls the cameras, and receives and stores the image data from the MRC and HRC before transmitting the image data to ground stations 300. The DHU also receives and stores the gyro data from the HRC.

The DHU 512 interfaces to a terminal computer 611. The terminal computer 611 receives the OCFs uplinked from mission control and transfers these files to the DHU 512 as well as inputs to ancillary data files and log files. The DHU 512 and the terminal computer 611 execute the time tagged commands listed in the OCF using their own internal clocks. The clocks are synchronized by use of a GPS-derived time synchronization signal (Pulse Per Second—PPS) to ensure that commands executed by both the DHU and the terminal computer are coordinated. The DHU also sends this same PPS signal to the Gyro Unit 509 in the HRC and to the Star Tracker Assembly Unit 511 so that the angular rate data and attitude data are also time synchronized to the commanding of the system.

Prior to each downlink, the DHU 512 sends the image and video data files to be downlinked, as well as the associated ancillary data and log files to the OMU 610 which then sends the data to the DTRES 607 for downlinking to a ground station 300.

Continuing with FIG. 6, the space segment also includes a Star Tracker 511 to provide increased accuracy attitude knowledge of the camera mounting location and is therefore mounted in the vicinity of the two cameras 502, 506. The data from the Star Tracker 511 may be used by the terminal computer 611 in real-time to control the pointing angles of the BPP 605 so that a given target on the ground is tracked with improved accuracy. The star tracker data is also be sent to the DHU 512 from the terminal computer 611 as ancillary data to be used for the ground processing.

Elements of the Star Tracker Unit Assembly (STUA) 511 include the Power and Interface Control Unit (PICU) 601, and two Star Tracker Heads 602, 603 (e.g. each pointed in a different direction). The STUA 511 also includes structural and thermal elements 604, such as a baseplate, secondary structural items (e.g., brackets), a thermal system (e.g. heaters, multi-layer insulation), and the associated cabling. The PICU 601 interfaces directly to the terminal computer 611 to provide the terminal computer 611 the real-time localized spacecraft attitude data that may be used to control the BPP 605.

Figure 7:
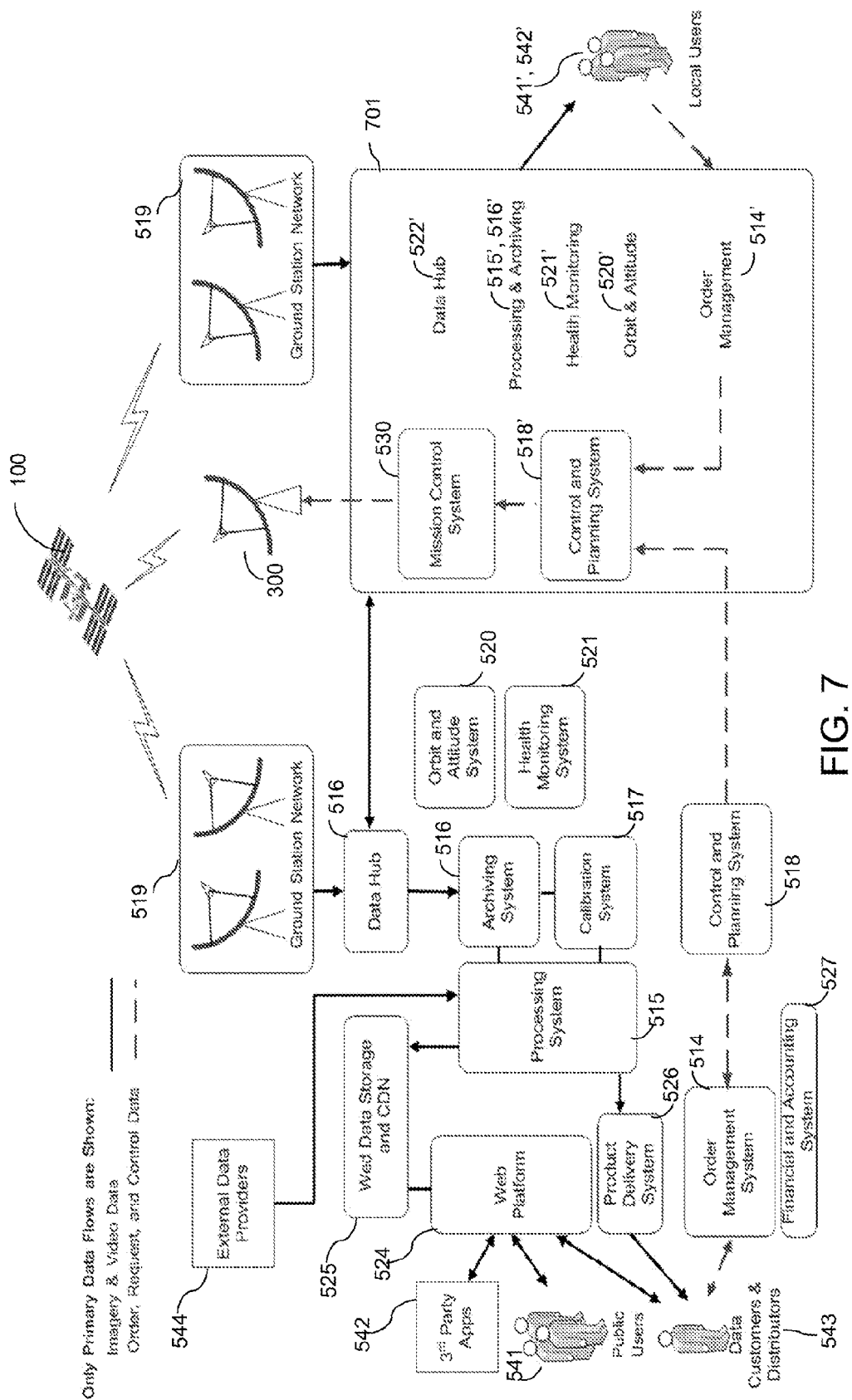
FIG. 7 is an example system diagram of the ground segment.
Figure 8:
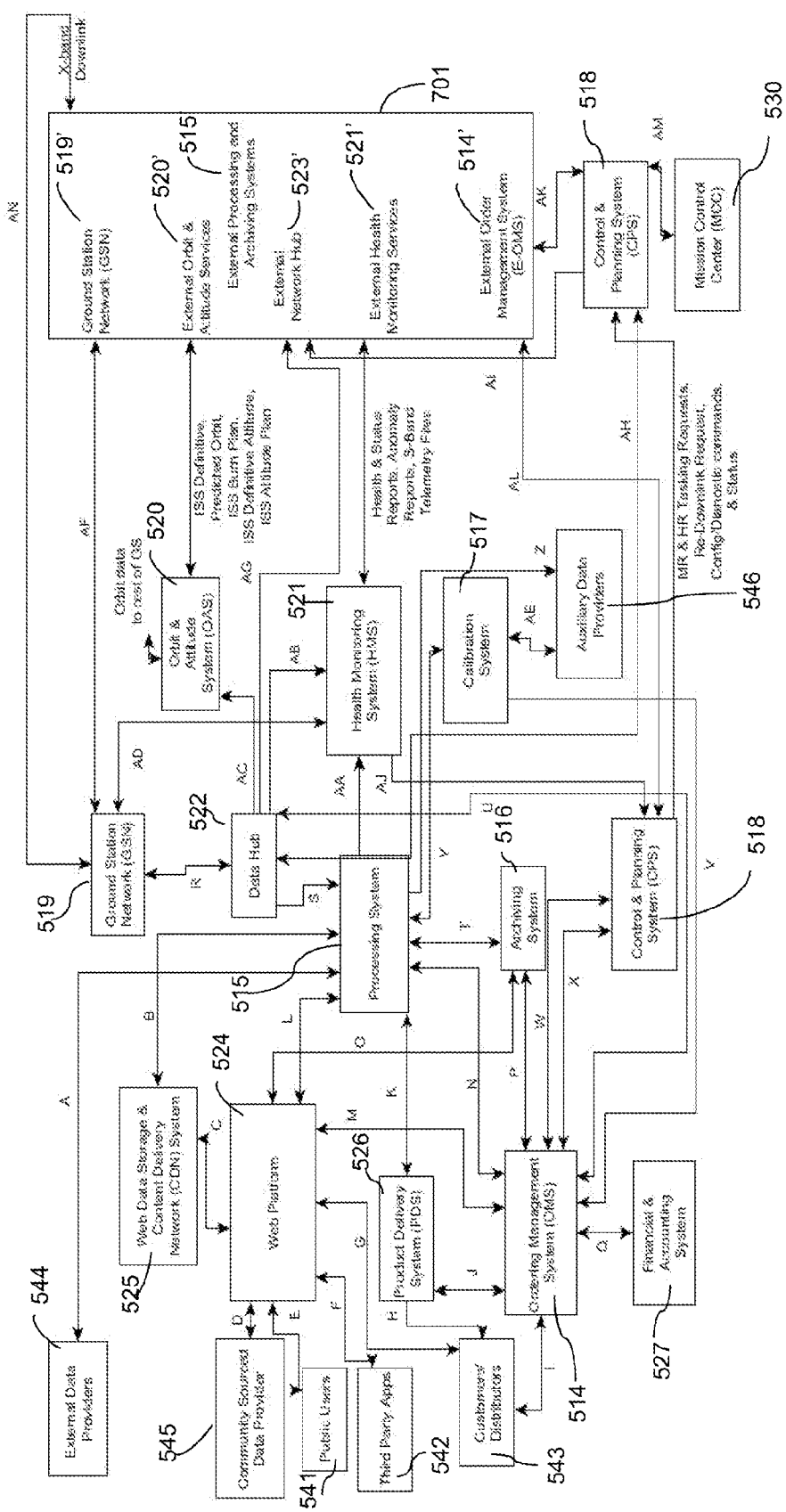
FIG. 8 is another example system diagram of the ground segment, further showing the data flow between components.

Turning to FIG. 7 and FIG. 8, example components of the ground segment 513 are shown in relation to each other. In FIG. 7, the solid connection lines show the flow of imagery and video data, and the dotted lines show the flow of other data (e.g. orders, requests, and control data). It can be appreciated these data flows are only examples, and that the direction and type of data flowing between the different components can be different from what is illustrated in FIG. 7.

As best shown in FIG. 7, data from the space segment 501 on the spacecraft 100 can be transmitted to ground station networks 519, which include ground stations 300.

As shown in FIG. 7 and FIG. 8, there are a number of external entities that can interact with the earth observation system.

Public Users (541): General public users can use the Web, internet, and mobile interfaces to look at imagery, video, and other information and to also contribute their own inputs.

Third Party Applications (542): Applications developed by third parties are configured to interact with the earth observation system's Internet services and resources via an application programming interface (API). The applications are expected to support mobile devices.

Customers/Distributors (543): Customers are those customers that place orders for new collections or specifically generated image and data products. Customers may place requests for map tiles among other types of products.

External Data Providers (544): In addition to the data acquired from the spacecraft 100, the ground segment of the earth observation system is configured to acquire imagery, video, and other data from External Data Providers. The External Data Providers may supply data specific to Earth observations. Examples of other data include temperature, human activity levels, natural events, human events, traffic, weather, geological data, marine data, atmospheric data, vegetation data, etc. The External Data Providers may supply data from obtained from other types of devices, including satellites, airplanes, boats, submersed vehicles, cars, user mobile devices, drones, etc. Data from external data providers may be used to generate encoded tiles.

Community Sourced Data Providers (545): Data, including image and video, may also be obtained from the general public. Data from community sourced data providers may be used to generate encoded tiles.

Auxiliary Data Providers (546): Auxiliary Data Providers provide supporting data such as Digital Elevation Models (DEMs), Ground Control Points (GCPs), Maps, and ground truth data, to the Earth observation system, such as the calibration system 517. Data from auxiliary data providers may be used to generate encoded tiles.

It can be appreciated that the data used to generate encoded tiles may be obtained from one or more different sources.

The Earth observation system includes a number of components, such as the Web platform 524. The Web platform 524 provides a Web interface to the general public. It includes capabilities to: browse and view imagery, videos and other geographic data; contribute additional information and social inputs; and accept requests for future data collection activities.

The Web Data Storage & Content Delivery Network (Web DS & CDN) 525 includes cloud infrastructure that is used to store the Web image data, video data, and community-sourced data, and distribute the data around the world using a Content Delivery Network (CDN) service.

The earth observation system also includes a Product Delivery System (PDS) 526. The PDS includes online storage that is used to serve up Products for retrieval by Customers/Distributors.

The Order Management System (OMS) 514 accepts orders for products and services and manages the fulfillment of those orders. The OMS is configured to task the CPS 518 for new acquisitions and the Processing System 515 for processing. Orders are tracked and feedback is provided to users.

The Control and Planning System (CPS) 518 is configured to provide the following functionality: assess the feasibility of future acquisitions; re-plan future acquisitions and downlinks to assess and adjust the feasibility of the overall collection plan for an upcoming time period; and, based on a resource model and updated resource status received from the mission control center (MCC) 530 and the ground station network (GSN) 519, create plans and command files for onboard activities including imaging and downlinks, and tasks for the GSN 519.

The Accounting & Financial, Billing and Customer Management Systems 527 are the general systems that are used to manage the sales and monetary funds of the image data and imaging services.

The Archiving System 516 archives the raw MRC and HRC image and video take data and associated ancillary data.

The Processing System 515 performs several functions. In an example embodiment, the processing system 515 processes the raw camera data to create image tiles (e.g. encoded tiles and map tiles), near real-time live feed tiles, and video files for the Web platform 524. This includes, for example, additional compression and other degradation (e.g. adding watermarks) to differentiate this data from the data that is sold to Customers/Distributors 543.

The processing system 515 also processes the data received from External Data Providers 544 and community-sourced data providers 545 to create image tiles and video files for the Web platform 524.

The processing system 515 also processes the raw MRC and HRC data to generate the image products and video products for the Customers/Distributors 543. In an example embodiment, the data for the customers/distributors 543 is of higher quality compared to the data provided on the Web platform 524. In this way, data presented on the Web platform 524 can be more easily displayed and consumed by lower power user devices, like tablets, mobile devices and laptops.

The Calibration system 517 monitors the image quality performance of the system and generates updated parameters for use in the rest of the system. This includes creating HRC and MRC radiometric and geometric correction tables that will be provided to the Processing system 515. The correction tables may include gains and offsets for the radiometric correction, misalignment angles, and optical distortion coefficients for the geometric correction. The Calibration system 517 also includes automated functions to monitor the characteristics of the HRC and MRC and, when necessary, perform updates to the radiometric and geometric correction tables. The Calibration system 517 may also include tools to allow the operators to monitor the characteristics of the HRC and the MRC, and the tools may also allow operators to perform updated to the correction tables.

The Ground Station Network (GSN) 519 is the collection of X-Band Ground Stations that are used for the X-Band downlink of image, video, ancillary, and log data. The GSN is a distributed network of ground stations (e.g. ten ground stations) providing for frequent downlink opportunities.

The Data Hub 522 is responsible for collecting, preprocessing and routing of downlink data.

The Health Monitoring System (HMS) 521 is configured to perform a number of functions. The HMS monitors the health status of the space segment 501, and generates of health status reports. The HMS organizes and stores engineering telemetry and diagnostic logs, which can be transmitted to an operator for viewing. The HMS also logs behavior and performance, such as by computing long-term trends and statistical analysis. The HMS is also configured to receive and store engineering inputs for the generation of maintenance, configuration and diagnostic activities of the space segment 501. The HMS is also configured to monitor general performance of the Ground Station Network (GSN). For example, the HMS monitors signal levels and lock synchronization, and may monitor other characteristics.

The Orbit & Attitude System (OAS) 520 publishes definitive and predicted orbit data, definitive and predicted attitude data of the ISS. The OAS also provides some related orbit and attitude related services to the rest of the system.

The Mission Control Center (MCC) 530 is used to manage communications between the spacecraft 100 and the ground. For supporting earth observation, the MCC station is used for uplinking the command files (e.g. OCFs) and receiving real-time heath and status telemetry. The MCC 530 is also configured to transmit resource availability about the spacecraft and the space segment 501 to the CPS 518. This resource availability data may include data regarding power resources, planned orbit adjustment maneuvers, and any scheduled outages or other availability issues.

The MCC 530 receives OCFs from the CPS 518. The MCC 530 then confirms that it meets all resource constraints and availability constraints. If there is a conflict where any resources are not available to optical telescope system, it will either request a new plan from the CPS 518 or could cancel some imaging sessions to satisfy the constraint.

It will be appreciated that FIG. 7 and FIG. 8 also show secondary systems or external systems 701 that may be used in conjunction with the systems described above. These secondary or external systems include a data hub 522', a processing and archiving system 515', 516', a health monitoring system 521', an orbit and attitude system 520', an order and management system 514', a network hub 523', and a ground station network 519'.

With respect to FIG. 8, below is Table 1, which maps the letters used to identify types of data flowing between the different systems. For example, FIG. 8 shows the letter 'A' located on the data link between the processing system 515 and the external data providers 544. As per Table 1, the letter 'A' means that other raw imagery and ancillary data, as well as other product imagery and metadata are exchanged between the processing system 515 and the external data providers 544. Other letters used in FIG. 8 are detailed in the table below.

TABLE 1

Example Data Flow Mapping for FIG. 8

| Letter Code | Example Data Flow |
|---|---|
| A | Other Raw Imagery & Ancillary Data, Other Product Imagery & Metadata |
| B | Map Tiles, Live Feed Tiles, Pin-point data, Products, Crowd-sourced Data Retrieval |
| C | Tiles, pin = point data, crowd-sourced data |
| D | Community-Sourced Data |
| E | Web Platform Interactions |
| F | Web Platform API |
| G | Catalog Browse, Ordering |
| H | Products |
| I | Feasibility Analysis, Order Management Delivery Notification |
| J | Delivery Status |
| K | Products |
| M | Requests, Status, Reports |
| N | Product Generation Request, Image/Video Take Notification |
| O | Catalog query |
| P | Catalog query |
| Q | Reports |
| R | Raw Product |
| S | Image/Video & Ancillary Level 0 Files |
| T | Dataset Submission, Dataset Retrieval, Catalogue Update |
| U | Data Hub, Log, Workflow Control File |
| V | Calibration Ordering |
| W | MR Acquisition Region, HR Acquisition Request, Re-Downlink Request & Status |
| X | Feasibility & Preplanning Dialogue |
| Y | Processing By-Products, Correction Parameters |
| Z | DEM, DSM, GCP, Map |
| AA | Anomaly Report |
| AB | Ancillary Level 0, Space Segment Log, Data Hub Log |
| AC | Ancillary Level 0 |
| AD | Pass Reports |
| AE | Truth Data |
| AF | Scheduling Coordination Dialogue, Reception Schedule |
| AH | Expected File List, Data Hub Log |
| AI | Expected File List |
| AJ | Manual Command File, Resource Status |
| AK | MR Acquisition Regions & Status, HR Acquisition Requests & Status, Re-Downlink Request & Status |
| AM | Availability & Resource Status, Advance Operating Schedule, Activity Schedule |
| AN | X-Band Downlink |

Example System for Processing and Distributing Earth Observation Images

Figure 9:
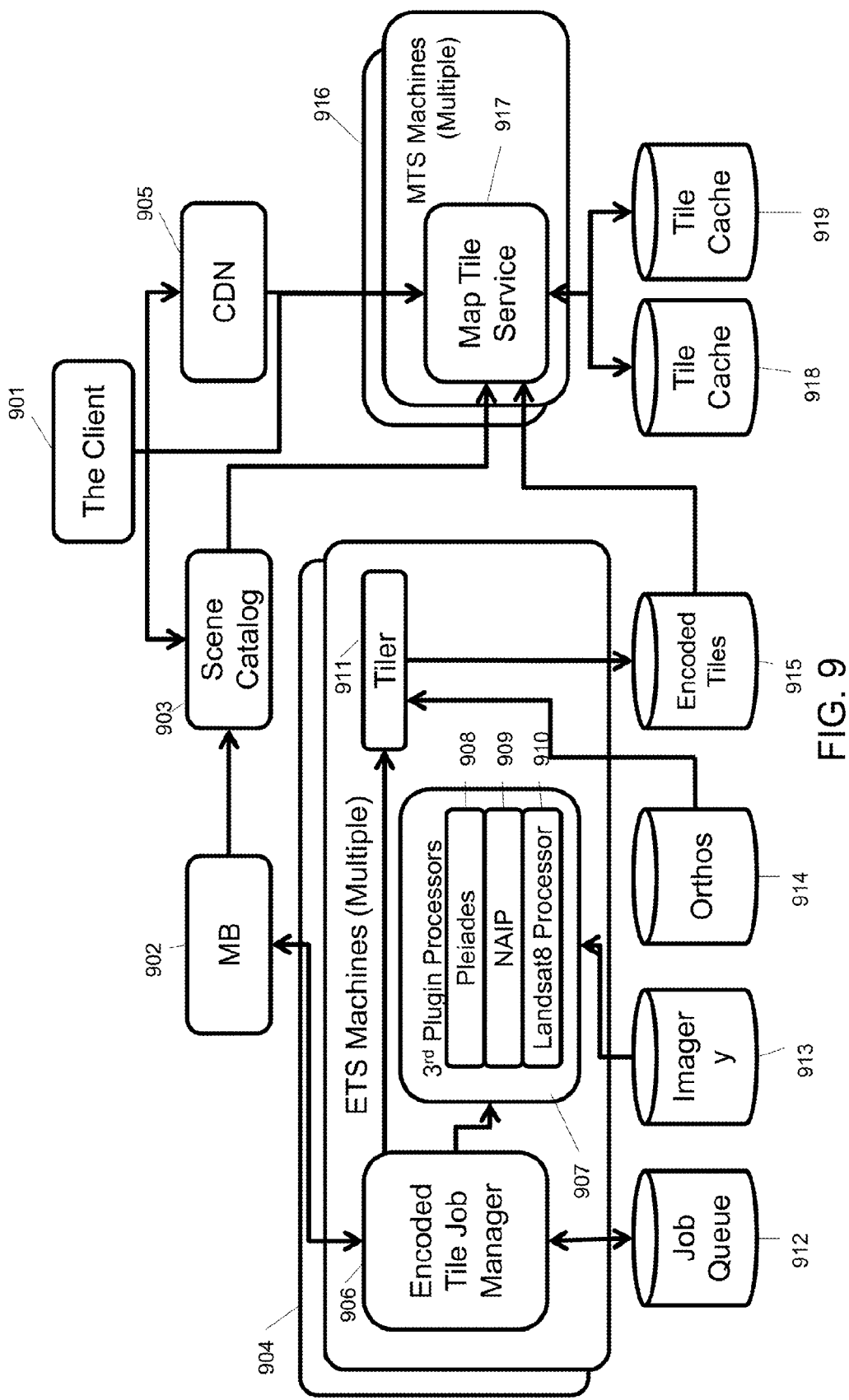
FIG. 9 is an example system diagram of a computing system for processing images to generate encoded tiles and map tiles.
Figure 10:
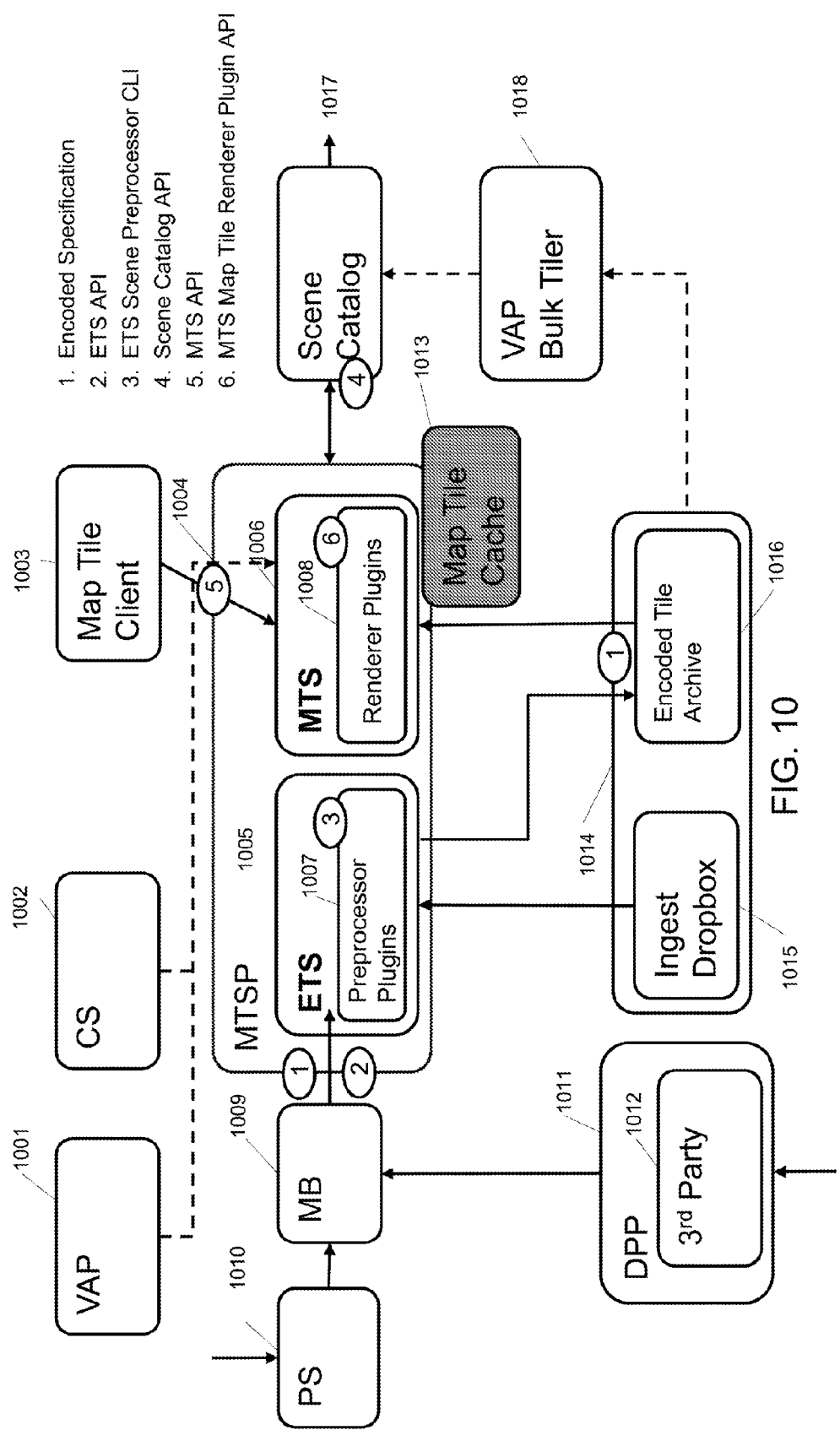
FIG. 10 is another example system diagram of a computing system for processing images to generate encoded tiles and map tiles.

FIG. 9 and FIG. 10 show different example embodiments of a system for processing and distributing Earth observation images, including computing devices for the Encoded Tile Service (ETS) and the Map Tile Service (MTS). The system in FIG. 9 and FIG. 10 may be combined with the example Earth observation system described above in FIGS. 5-8. For example, the image data and other data may be obtained from the Earth observation system described above, and this image data and other data is then processed by the ETS. In another example, one or more components of the system in FIG. 9 and FIG. 10 may coincide with or cooperate with the components of the processing system 515, the external data providers 544, the Web data storage and CDN 535, the Web platform 524, the product delivery system 526, the order management system 514, 3$^{rd}$ party applications 542, public users 541, and data customers and distributors 543.

In another example embodiment, the system of FIG. 9 and FIG. 10 is used independent of the Earth observation system described in relation to FIGS. 5-8. In other words, the system of FIG. 9 and FIG. 10 may obtain imagery and data from other data sources, such as other Earth observation or planetary observation systems.

Turning to FIG. 9, an example system includes one or more Encoded Tile Service (ETS) machines 904 and one or more Map Tile Service (MTS) machines 916. The ETS machines and the MTS machines are computing devices each comprising a processor, memory and a communication device to communicate with other devices over a data network. As shown, the ETS machines are separate from the MTS machines. However, in another example embodiment, the functions of the ETS and the MTS may reside on the same machines.

The ETS machine(s) 904 are responsible for obtaining data and storing data, using the data to encode images, and storing the encoded images for use by other devices and processes, including the MTS machine(s) 916. The ETS machine(s) 904 include an encoded tile job manager 906, one more third party plugin processors 907, and a tiler module 911.

The encoded tile job manager 905 receives a job request with a job type from an ETS client. An example of a job request is:

```
{
    "meta": {
        "callback_uri":"http://url/catalog/api/search/callback",
        "header_comment": "Landsat8",
        "message_date": "2014-02-20T00:00:00.000Z",
        "message_id": "123",
        "message_type": "uts_job_creation",
        "message_version": "1",
        "orginator_address": "local",
        "orginator": "by hand"
    },
    "payload": {
        "doCleanup": false,
        "job_type": "tile",
        "scene_id": "LC81860532014192LGN00",
        "scene_url":
        "/vagrant/test_data/LC81860532014192LGN00"
    }
}
``` where job_type defines the type of functions to be applied to the ETS product, e.g. a name of a sensor, tile, or other type of processing required to encode a tile. An example sensor is an Operational Land Imager (OLI) sensor that includes refined heritage bands, along with three new bands: a deep blue band for coastal/aerosol studies, a shortwave infrared band for cirrus detection, and a Quality Assessment band. Another example sensor is a Thermal Infrared Sensor (TIRS) sensor that provides two thermal bands. Job requests pertaining to other types of satellites or image acquisition devices may be used. The encoded tile job manager 906 is also configured to execute instructions from the plugins 907 related to the job type. The job requests may be stored in a job queue database 912.

The one or more third party plugin processors 907 are configured to download and preprocess a scene, for example to generate a scene metadata file. In an example embodiment, the scene metadata file is a JSON file type. The plugin processors are also configured to update a job's status via an API of encoded tile job manager 905. In an example embodiment, for each job request, a plugin processor 907 will provide one value (e.g. the value 0) if the job request was completed successfully and will provided another value (e.g. another number) if the job failed to complete. In an example embodiment, there is a plugin processor for different types of data acquisition platforms or devices. For example, there is a Pleiades plugin processor 908 for the Pleiades satellite images acquired by one or both of a Pleiades-1A satellite and a Pleiades-1B satellite, and any future Earth-imaging satellites to be added to the Pleiades satellite constellation. In another example, there is a National Agriculture Imagery Program (NAIP) plugin processor 909 that is related to processing job requests for NAIP imagery. Typically, NAIP data includes aerial imagery that has been acquired during the agricultural growing seasons in the continental United States. In another example, there is a Landsat8 plugin processor 910 relating to the Landsat 8 satellite. Other plugin processors may be used.

Imagery metadata may be stored in an imagery feedstock database 913. The image files are stored in an object storage system as well as a set of files and respective metadata files. In an example embodiment, the plugin processors obtain one or more images from the database 913 to process the data based on the job requests. In an example embodiment, if orthogonal rectified images are not already provided by the raw images, then the raw images are processed to produce orthogonal rectified images. These orthogonal rectified images are stored in a database 914.

The tiler module 911 is configured to obtain the images from the database 914 and also to obtain job request information from the encoded tile job manager 905. This obtained data is used to generate Encoded Tiles, which the tiler module stores in an encoded tiles database 915. Details about how the tiler module encodes the images to produce encoded images or Encoded Tiles are described below.

In an example embodiment, the messaging bus 902 routes imagery related notifications to and from the ETS machine (s) 904, including job requests and updates regarding job requests.

Jobs may either come from delivery events from the DPP or from processing events from the processing system. The job is ingested and processed to produce an encoded tile. Requests come in directly to the Job manager.

During the tiling process, ETS puts encoded tiles to an object store. Once the job is complete, the ETS publishes a message to the message bus 1308, with the encoded tile metadata as a payload. Then the scene catalog 903 consumes the message and stores the metadata in the database. The MTS searches the scene catalog 903 for the location of the tile bundle, then renders the output as a map tile or a set of map tiles.

An MTS machine 916 includes an MTS module 917. The MTS module is configured to receive a request to generate a map tile. The request may originate from a tile client 901. It is appreciated that the tile client is a computing device that includes a communication device to exchange data with the map tiling service platform.

The MTS module 917 is configured to merge multiple Encoded Tiles, such as those stored in the database 915, to generate one or more map tiles. The map tiles are stored in one more data stores 918, 919.

Turning to FIG. 10, another example embodiment of a system is shown. The system shown in FIG. 9 describes the method of encoding a tile then rendering a map tile. The system shown in FIG. 10 describes how FIG. 9 interacts with the ground segment for value added processing. The system includes a VAP 1001, a calibration system (CS) 1002, a map tile client 1003, a map tile service platform (MTSP) 1004, a processing system (PS) 1010, an MB 1009, a scene catalog 1017, a DPP 1011, a AS 1014, a VAP bulk tiler 1018. The map tile client 1003 is similar or the same as the client 901. VAP is the value added processing system in which the system uses calibration information from the calibration system (CS) to generate image products with a sensor properly standardized, tuned, and corrected. It will be appreciated that some of the components shown in FIG. 10 are coincide with or are the same as the components in the ground segment described in FIG. 5.

VAP Bulk tiler is a system for creating and rendering precomputed map tiles using MTS rendering plugin architecture for computational algorithms.

The MTSP 1004 comprises one or more computing devices (or servers), each one comprising a processor and a memory. The MTSP includes an ETS module 1005 and a MTS module 1006. The ETS module is similar in functionality to ETS machine(s) 904. The ETS module also includes one or more preprocessor plugins 1007, which is similar in functionality to the plugin processor 907. The MTS module is similar in functionality to the MTS machines 916. The MTS module includes one or more renderer plugins 1008. A renderer is a way to translate digital numbers (DNs) from encoded tile data sets to color pixel values of a map tile using specific criteria. For example a renderer uses red, green, and blue bands with specific coefficients, such as in a LUT, applied to create a "true color" map tile. A LUT, as used herein, refers to a colored look up table that, for example, maps numbers to a pixel color pallet.

The MTSP also includes or is connected to a map tile cache 1113, which is similar in functionality to the tile caches 918, 919.

The data archiving system (AS) 1014 includes an ingest dropbox in the object storage system 1015 and an encoded tile archive 1016

In an example embodiment, the ESB 1009, similar or identical to the ESB 902, sends an encoded tile specification to the MTSP 1004. The ESB, for example, interfaces with the MTSP via an ETS application programming interface (API).

The ETS scene preprocessor command line interface (CLI) allows a software client programs to invoke preprocessing commands to create feedstock imagery, and related operations.

The encoded tile archive 1016 also receives an encoded tile specification from the ETS module 1005.

It will be appreciated that any module, component, or system exemplified herein that executes instructions or operations may be implemented using one or more processor devices, although not necessarily shown. It will be appreciated that any module, component, or system exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems, modules or components of the Earth observation system 500 or the system for processing and distributing Earth observation images shown in FIG. 9 and FIG. 10, or accessible or connectable thereto. Any application, system or module herein described may be implemented using computer readable/executable or instructions or operations that may be stored or otherwise held by such computer readable media.

In an example embodiment, tiling services are deployed inside a private subnet (not shown). This allows for non-encrypted communication between internal components in the system.

In an example embodiment, orthos are formatted as 16-bit GeoTIFF images with multiple RGB, gray scale and bitmask images. By way of background, GeoTIFF is a public domain metadata standard which allows georeferencing information to be embedded within a TIFF file. The potential additional information includes map projection, coordinate systems, ellipsoids, datums, and anything else used to establish the exact spatial reference for the file.

In an example embodiment, caching is implemented by the MTS.

In an example embodiment, using a content delivery network (CDN) will both decrease the load on the MTS and improve response time by caching tiles on the edge of the network, which is a CDN caching mechanism to deliver content geographically nearest to the client. Furthermore, unlike the browser caches, a CDN is able to share content between multiple users.

In an example embodiment, the system includes HTTP Restful Web services, which will be used for the internal service APIs and the Web facing service APIs. Some aspects of the system that are considered when implementing APIs include: a client-server configuration, requests that are stateless, the cacheable nature of map tiles, layering of the system, code on demand, and uniform interface.

Regarding the client-server configuration, by separating the client and the server, it is possible for multiple clients, including 3rd party clients, to take advantage of the capabilities provided by the MTS.

Regarding requests that are stateless, it is herein recognized that stateless requests are beneficial to scaling through technologies like load balancers. In particular, each stateless request is independent of the previous stateless request and contains the information and data the server needs to fulfill the request. It is herein recognized that, if a request is not stateless, it would be difficult to process multiple tile requests from a single client in parallel.

Regarding the storage of map tiles, it is herein recognized that map tiles are bandwidth intensive. However, the bandwidth consumption is offset by the map tile being highly available via cache.

Regarding cache levels of the system, it is recognized that caching occurs at many levels and the ability to push the cache out closer to the user with a CDN and multiple intermediate caching will greatly increase the performance and efficiency of the system. The layers include disk file cache, in memory cache, object cache, and CDN cache.

Regarding the aspect of tile encoding on demand, it is recognized that map tile clients will leverage common layer implementations for popular mapping development frameworks that can be dynamically downloaded within the viewport of a Web browser.

Regarding the aspect of a uniform interface, the MTS is configured to provide standard map layers as well as a range of dynamic layers and even non-pixel based products, such as ship pinpoints from an automatic identification system (AIS), or other georeferenced data.

The use of uniform resource identifiers (URIs) and different representations will provide the opportunity to simplify a potentially complex set of operations, by providing a standard method for requesting map tile and geospatial data.

In another example aspect of the system, a load balancer is included which is configured to automatically create new server instances to distribute a service's workload between those many server instances. A non-limiting example of a load balancer is provided by Amazon's infrastructure-as-a-service.

In another example aspect of the system, distributed job queues are used. A distributed job queue is an architectural pattern where a message queue is used to coordinate a set of devices or functions performing a set of tasks. Consider, for example, that, much like bank tellers processing the next customer in line, each worker pulls a job from the head of the queue and performs the task. When the task is complete, the worker acknowledges the message has been processed and it is removed from the queue. If there are no jobs in the queue, the workers block until one becomes available. The message queue ensures that each job in processed by only one worker. If the job is not processed within a configurable timeout period, the job becomes available again for another worker to process. The devices and module described herein process the jobs in a similar manner.

Job queues, for example, are implemented using a database and a client-library that honors a locking protocol. For example, a document database that supports atomic updates to documents may be used. An example of such a database is provided under the trade name MongoDB. Using the appropriate locking strategy, the document database can be used as a repository for job states. The advantage of using a database instead of message queues is that job data is retained after the job is complete and additional metadata is attached to the job. In other words, the additional metadata may be obtained or queried after the job is complete.

In another example aspect of the system, the system is configured for auto scaling. Auto scaling allows the system to scale its cloud computing capacity up or down automatically according to predefined conditions. With auto scaling, the system is able to increase the amount of data space or units of cloud computing power seamlessly during demand spikes to maintain performance, and to decrease the amount of data space or units of cloud computing power automatically during demand lulls to reduce costs. Auto scaling is particularly well suited for applications that experience hourly, daily, or weekly variability in usage.

Auto scaling is used in particular for the ETS and the MTS. The ETS will auto-scale based on the size of the job queue and the MTS will auto-scale based on the number of tile requests.

In another example aspect of the system, the system is configured to include multi-later caching. Caching in the MTSP may reduce duplicate and costly retrieval and processing of encoded tiles.

The MTSP is configured to use caching in various places, including caching encoded tiles as the merging layer in order to speed up the creation of map tiles. If the latency of downloading an encoded tile from a cloud computing server may be removed, the overall creation of a map tile is faster.

The MTSP is also configured to also cache map tiles after they have been produced, which will speed up any client requests, since there is no need to download and merge any number of encoded tiles into a map tile.

In another example embodiment, the system is configured to create encoded tiles from source imagery associated with a scene. When a new scene is submitted, the system internally creates a job object to track the tiling process. When the tiling process is complete, the job status is updated. Periodically completed jobs are removed from the system.

The system also includes a REST API that exposes the following resources for managing jobs and the encoded tiles.

It is appreciated that a "job" tracks the workflow status associated with encoding a single scene into a set of encoded tiles. Each job has a number of properties, including a job ID, a scene, an OrthoUrl and a status.

The job ID is an opaque string used to refer to the job in in calls to various method. A job ID for a given job is assigned by the API at creation time.

The scene refers to an identifier or name of the scene to be processed by the job.

The OrthoUrl refers to an URL of the ortho image associated with the scene. The URL resolves to a valid ortho-rectified imagery accessible via HTTP, S3, or NFS.

The status refers to the status of the job and includes any of the following: waiting; running; completed; failed; and creating jobs.

Creating a job includes a HTTP POST of a job description to /jobs, which assigns a job ID and returns an updated job description containing the ID and job status.

Here is an example of a request to create a job: {"scene": "1234", "ortho_url": "file://scenes/1234/1234.tif"}

To list jobs, a GET command may be issued against/jobs to return a list of recent jobs in the system. An example of returned data from such a GET command is: {"total_items": 1, "items": [{"id": "1234", "self": "http://host/uts/jobs/1234", "status": "waiting", "scene_id": "abcd"}]}

When deleting a job, the URL of the job is used. For instance, "DELETE /jobs/abcd" would delete the job "abcd".

When retrieving jobs, the URL of a desired job is also used. For example, "GET /jobs/abcd" would retrieve the description of job "abcd".

Additional details regarding the job parameters are below.

The following are example parameters used by the system to create a job.

scene_id (string): This is the Ortho Scene ID, which will be included in the encoded tiles created from this scene.

scene_url (string): This is the Ortho Scene folder URL, which includes a manifest file and ortho imagery that will be processed. The manifest file, for example, is JSON-formatted (e.g. manifest.json) and includes a list of imagery and mask file locations, with associated descriptions.

job_type (string): This identifies the type of job to run which determines which preprocessing scripts (if any) will be applied. If not the job type is set to a default value, which is tile, and assumes the image is already preprocessed.

doCleanup (boolean): This is a flag to the preprocessor to clean up its temporary files. The default value for this parameter is true. The false value is intended to be used only for debugging.

The following is an example parameter used by the system to delete a job.

id (string): This is an opaque string used to refer to the job in in calls to various method. This ID for a job, or job ID, is assigned by the API at creation time.

The following are example parameters used by the system to read and update a job.

id (string): This is an opaque string used to refer to the job in in calls to various method. This ID for a job, or job ID, is assigned by the API at creation time.

start_time (integer): This is the time the object started processing.

stop_time (integer): This is the time the object finished processing.

created_at (integer): This is the time the object was created, for example, measured in seconds.

duration (string): This is the time spent processing in XXh XXs XXms, estimated_tiles (integer): This is the estimated number of tiles to process.

processed_tiles (integer): This is the number of tiles already processed.

tiles_per_second (integer): This is the number of tiles processed per second in a given time range, for example, XXh XXs.

estimated_time (string): This is the estimated time left to complete a tiling job.

error_type (string): This is error information in the event of job exceptions.

job_type (string): This is the type of job to run which determines which preprocessing scripts (if any) will be applied. If not, the default value is set to "tile" and assumes the image is already preprocessed.

doCleanup (boolean): This is a flag to the preprocessor to clean up its temporary files. The default value for this parameter is true. The false value is intended to be used only for debugging.

scene_id (string): This is the ID of the scene to be processed by the job.

scene_url (string): This is the URL of the ortho image associated with the scene. The URL resolves to a valid ortho-rectified imagery, which, for example, is accessible via HTTP, S3, or NFS.

status (string): This is the status of the job, which includes one of the following: Waiting, Running, Completed, Failed.

The resulting output of a job is a set of encoded tiles. Each encoded tile contains multiple raster layers and associated metadata packaged in a file. The file for the encoded tile may be a compressed file, such as a ZIP.

The file for an encoded tile contains the following files:

A) {scene_id}_rgb.[image format]. This is a compressed image containing Red, Blue, and Green bands B) {scene_id}_re.[image format]. This is a compressed image containing the Red Edge band.

C) {scene_id}_nr.[image format]. This is a compressed image containing the Near IR band.

D) {scene_id}_mask.tif. This is a GeoTIFF containing one or more masks for the image, such as a cloud cover mask, snow cover mask, and water cover mask.

E) {scene_id}_metadata.json. This is an associated image metadata and, for example, is in a flexible JSON format.

Other files or data may be included in the file for an encoded tile. Non-limiting of examples of other data included in the file are: data about the sensors, land cover percentage, zoom level of the scene, and NDVI data. Furthermore, the format of the data (e.g. file extension) may be different than what has been shown in the above examples. In an example embodiment, each encoded tile has its own file that packages the above layers and metadata.

Obtaining and Encoding Images (Using the ETS)

As noted above, the ETS generates encoded tiles and stores them in cache memory or in an archiving system to be used later by another module or process, for example the MTS.

In an example embodiment of the encoder process, the inputs include scene metadata with an address for a given ortho image. For example, the address is a URL to access the ortho image. Another input for the encoder process is the ortho image, which preferably, although not necessarily, is in a GeoTIFF format.

The output of the encoder process includes: full resolution encoded tiles; reduced resolution encoded tiles; and updated scene metadata.

The encoder process generally includes posting a scene to the encoder service, for example from the MB. The process also includes obtaining the ortho image and metadata from storage, for example, based on the inputs. Then, the obtained ortho image is rendered into a collection of encoded tiles. An overview of the encoded tiles is then generated. The encoded tiles are persisted in an archiving system or in cache, or both. The updated scene meta data is published to the MB.

In another example embodiment, with respect to the inputs, the ETS normalizes the input imagery and associated metadata formats to the formats used by the ETS. ETS performs necessary processing steps such as resampling, orthorectification and reprojection to normalize input imagery. A directory with the specified information is created and a RESTful message is sent to the ETS to start processing. An ETS Client performs this step (Processing System, Data Partner Portal). By way of background, REST or representational state transfer is an abstraction of the architecture of the World Wide Web, and a RESTful message is a message that conforms to the REST architecture.

Example characteristics of the inputs for the ETS are summarized below. An example characteristic is that the inputs are placed in a data directory on a shared file system. Examples of shared file systems are available under the trade names Gluster and Network File System (NFS). Another example characteristic is that the input includes a JSON-formatted Manifest file containing locations for the imagery and mask files. Another example characteristic is that the input includes a JSON-formatted Scene-specific metadata file containing metadata from the processing system (PS). Another example characteristic is that the input includes RBG or PAN GeoTIFF containing either the red, green and blue or the panchromatic band(s). Another example characteristic is that imagery or data for additional bands are in the format of individual GeoTIFF files. Another example characteristic is that each mask is in the format of an individual GeoTIFF file. Another example characteristic is that the inputted data be formatted to a specific coordinate reference system (CRS). An example CRS is the EPSG:3857. Other example characteristics regarding the imagery is that the grid spacing matches the maximum zoom level, and that the top-left and bottom-right pixels aligned with the encoded tile grid. Another example characteristic is that the imagery has an 8 or 16 bit pixel depth. It will be appreciated that the above characteristics of the inputs are examples, and there may be different, or more, or less of such characteristics.

Regarding the JSON-formatted Manifest file, it contains a list of imagery and mask file locations, and associated descriptions. Below is a table explaining example data within the JSON-formatted Manifest file.

TABLE 2

Example data in Manifest File

| Element | Descriptions | Notes |
| --- | --- | --- |
| Zoom Level Max | The maximum zoom level | Reflects the zoom level of the input imager |
| Zoom Level Min | The minimum zoom level to render into encoded tiles | The ETS will generate additional encoded tiles at zoom levels down to the minimum zoom level |

TABLE 2-continued

Example data in Manifest File

| Element | Descriptions | Notes |
| --- | --- | --- |
| Tables | | |
| Name | The name of the source file | |
| Source File Name | The URI of the location of the source file. | The system will support a relative file path |
| Categories | A list of name value pairs to add information about the source file. Categories are used to specify masks. | |
| Metadata | An example format is a JSON object. | An example would be Radar reflective table. |
| Bands | | |
| Name | The name of the source file | |
| Source File Name | The URI of the location of the source file. | The system will support a relative file path |
| Source Band | The integer location of the band in the GeoTiff file | RGB has three source_bands (1, 2, 3) |
| Color Interp | The enumeration of color interpretations. Values are: Gray, Palette, Red, Green, Blue, Alpha, Hue, Saturation, Lightness, Cyan, Magenta, Yellow, Black, or Undefined | Standard GDAL Names |
| Metadata | An example format is a JSON object. | An example would be a Radar reflective table. |
| Masks | | |
| Name | The name of the source file | |
| Source File Name | The URI of the location of the source file. | The system will support a relative file path |
| Source Band | The integer location of the band in the GeoTiff file | RGB has three source bands (1, 2, 3) |
| Categories | A list of name value pairs to add information about the source file. Categories are used to specific masks: Mask, No Data Mask, Cloud Mask, Water Mask, Snow These masks may be included with every scene and additional masks may or may not be included. | I |
| Metadata | An example format is a JSON object. | An example would be a Radar reflective table. |

Additional details about the output of the encoding process are below. In particular, the output includes a scene metadata file, which may be in the JSON-format. The scene metadata file includes pass through meta data information. The scene meta data file is included in the file for a given encoded tile, which distributed to the scene catalog. As noted above, the file for the given encoded tile may be compressed (e.g. as a ZIP file). In an example embodiment, the scene metadata file is named {scene_id}_metadata.json.

Example details about the data in the scene metadata file are in the below table.

TABLE 3

Example data in Scene Metadata File

| Field Name | Description |
| --- | --- |
| Archive Dataset Identifier | This refers to the identifier of the raw data stored in the Archiving System. This identifier is applicable if the raw data is stored in the Archiving System. A value of "−1" is used if the raw data is not stored in the Archiving System. |

TABLE 3-continued

Example data in Scene Metadata File

| Field Name | Description |
|---|---|
| Scene Identifier | This is the identifier of the scene. |
| Remote Identifier | This refers to the data owner specific image acquisition identifier. |
| Image Path | This refers to the identifier for the image path. It is applicable for platforms that have a repeating image path/row orbit. |
| Image Row | This refers to the identifier for the image row. It is applicable for platforms that have a repeating image path/row orbit. |
| Data Owner Identifier | This identifier is used for attribution and tracking purposes. |
| Platform Identifier | This identifier identifies the platform on which the sensor gathered the data. |
| Sensor Identifier | This identifier identifies the sensor that gathered the data. |
| Sensor Class | The sensor class may be represented by numerical values.<br>0 = Optical<br>1 = Thermal<br>2 = SAR<br>3 = Optical and Thermal<br>. . .<br>255 = Unknown<br>The value of the sensor class determines the schema for the metadata included for each band in the manifest.json file as defined in Table 4. For combined sensors (e.g., optical and thermal) the metadata for the optical bands will correspond to the optical metadata schema while the metadata for the thermal bands will correspond to the thermal metadata schema. |
| Acquisition UTC Date/Time | UTC date and time at the center of the image, for example, using the ISO 8601 Format. |
| Processing UTC Data/Time | UTC date and time of processing, for example, using the ISO 8601 Format. |
| Acquisition Local Date/Time | Local date and time at the center of the image, for example, using the ISO 8601 Format. |
| Acquisition Solar Time of Day | This refers to the solar time of day (relative to solar noon) calculated from the position of the sun at the time of acquisition. |
| Season | This refers to the hemispherical-specific season determined by latitude and time of year relative to the four annual solstices. |
| Phenological Season | This refers to the phenological specific season determined by latitude, altitude and time of year relative to the local vegetative growth cycles. |
| Bioclimatic Phase | This refers to the bioclimatic phase (e.g. emergence, bloom, leaf-on vigorous growth, harvest, decay, dormant) determined by latitude, altitude and time of year relative to the local vegetative growth cycles. |
| Earth Sun Distance | This refers to the normalized distance between the Earth and the Sun. |
| Sun Elevation Angle | This refers to the elevation angle (e.g. 0° to 90°) from horizon to the sun at scene center. |
| Sun Azimuth Angle | This refers to the azimuth angle (e.g. −180° to +180°) clockwise from north to the sun at scene center. |
| Sensor Elevation Angle | This refers to the elevation angle (e.g. 0° to 90°) from horizon to the sensor at scene center. For example, the sensor elevation angle is set to 0° for a Sun Elevation Angle of 90°. |
| Sensor Azimuth Angle | This refers to the azimuth angle (−180° to +180°) clockwise from north to the sensor at scene center. For example, the sensor azimuth angle is set to 0° for a Sensor Elevation Angle of 90°. |
| Sensor Roll Angle | This refers to the sensor roll angle relative to the platform direction of motion. |
| Sensor Pitch Angle | This refers to the sensor pitch angle relative to the platform direction of motion. |
| Sensor Yaw Angle | This refers to the sensor yaw angle relative to the platform direction of motion. |
| Land Cover Percentage | This refers to the percentage (0-100) of visible (i.e. not obscured by cloud) land coverage, including permanent ice coverage. For example, a value of "−1" is used when there is no information.<br>This is relevant, for example, to Earth images. |
| Water Cover Percentage | This refers to the percentage (0-100) of large water body coverage. For example, a value of "−1" is used when there is no information.<br>This percentage is calculated from the water mask. |
| Cloud Cover Percentage | This refers to the percentage (0-100) of cloud coverage. For example, a value of "−1" is used when there is no information.<br>This percentage is calculated from the cloud mask. |
| Snow Cover Percentage | This refers to the percentage (0-100) of snow coverage. For example, a value of "−1" is used when there is no information.<br>This percentage is calculated from the snow mask. |
| Geometric RMSE | This refers to a root mean squared error of the geometric model. |
| Geometric RMSE X | This refers to a root mean squared error of the geometric model in X (pixel). |
| Geometric RMSE Y | This refers to a root mean squared error of the geometric model in Y (line). |
| LandSat Operational Land Imager (OLI) Image Quality | This value is applicable for LandSat imagery. This quantity is a composite measure of the image quality for the bands. A value of 9 is the best quality, 0 is the worst and a value of −1 indicates that the image quality is not calculated or assessed. This indication of image quality is used for input to searches and MTS plugins. |
| LandSat Thermal Infrared Sensor (TIRS) Image Quality | This value is applicable for LandSat Imagery. This quality is a composite measure of the image quality for the thermal bands. A value of 9 is the best quality, 0 is the worst and a value of −1 indicates that the image quality is not calculated or assessed. This indication of image quality is used for input to searches and MTS plugins. |
| ETS Zoom Level | This refers to the zoom level of the scene. |
| Maximum X UTS Tile Coordinate | This refers to the maximum coordinate value in the X direction for the scene in Google map tile coordinates. |
| Minimum X UTS Tile Coordinate | This refers to the minimum coordinate value in the X direction for the scene in Google map tile coordinates. |
| Maximum Y UTS Tile Coordinate | This refers to the maximum coordinate value in the Y direction for the scene in Google map tile coordinates. |
| Minimum Y UTS Tile Coordinate | This refers to the minimum coordinate value in the Y direction for the scene in Google map tile coordinates |
| Ground Sample Distance | This refers to the original ground sample distance for the original imagery. |
| Storage URL | This refers to the URL of the location of the source file. The system will support a relative file path. |
| Boundary | GeoJSON that describes the polygon of the area of the scene geometry |

The sensor class information below in Table 4 is considered an input to the ETS (e.g. data in the manifest file requires a metadata file before any tiling, whether our own preprocessor generates it, or whether PS generates it In an example embodiment, sensor metadata is also included with the processed image from the processing system sent to the ETS. In an example embodiment, the data is formatted into a JSON file.

TABLE 4

Examples of Sensor Class Metadata

| Sensor Class/Element | Description |
|---|---|
| Optical | |
| Maximum Radiance | Maximum radiance in units of watts/(meter squared * ster * μm). |
| Minimum Radiance | Minimum radiance in units of watts/(meter squared * ster * μm). |
| Radiance Gain | Gain in units of watts/(meter squared * ster * μm). |
| Radiance Offset | Offset in units of watts/(meter squared * ster * μm). |
| Maximum Reflectance | Maximum reflectance. |
| Minimum Reflectance | Minimum reflectance. |
| Reflectance Gain | Reflectance gain. |
| Reflectance Offset | Reflectance offset. |
| Maximum Wavelength | Maximum wavelength in units of nanometers (nm). |
| Minimum Wavelength | Minimum wavelength in units of nanometers (nm). |
| Thermal | Offset in units of watts/(meter squared * ster * μm). |
| Maximum Radiance | Maximum radiance in units of watts/(meter squared * ster * μm). |
| Minimum Radiance | Minimum radiance in units of watts/(meter squared * ster * μm). |
| Radiance Gain | Gain in units of watts/(meter squared * ster * μm). |
| Radiance Offset | Offset in units of watts/(meter squared * ster * μm). |
| K1 | Band specific thermal conversion constant. |
| K2 | Band specific thermal conversion constant. |
| Maximum Wavelength | Maximum wavelength in units of nanometers (nm). |
| Minimum Wavelength | Minimum wavelength in units of nanometers (nm). |

By way of background, ster refers to the unit steradian (e.g. a dimensionless unit of a solid angle with the ratio between the area subtended and the square of its distance from the vertex)

Figure 11:
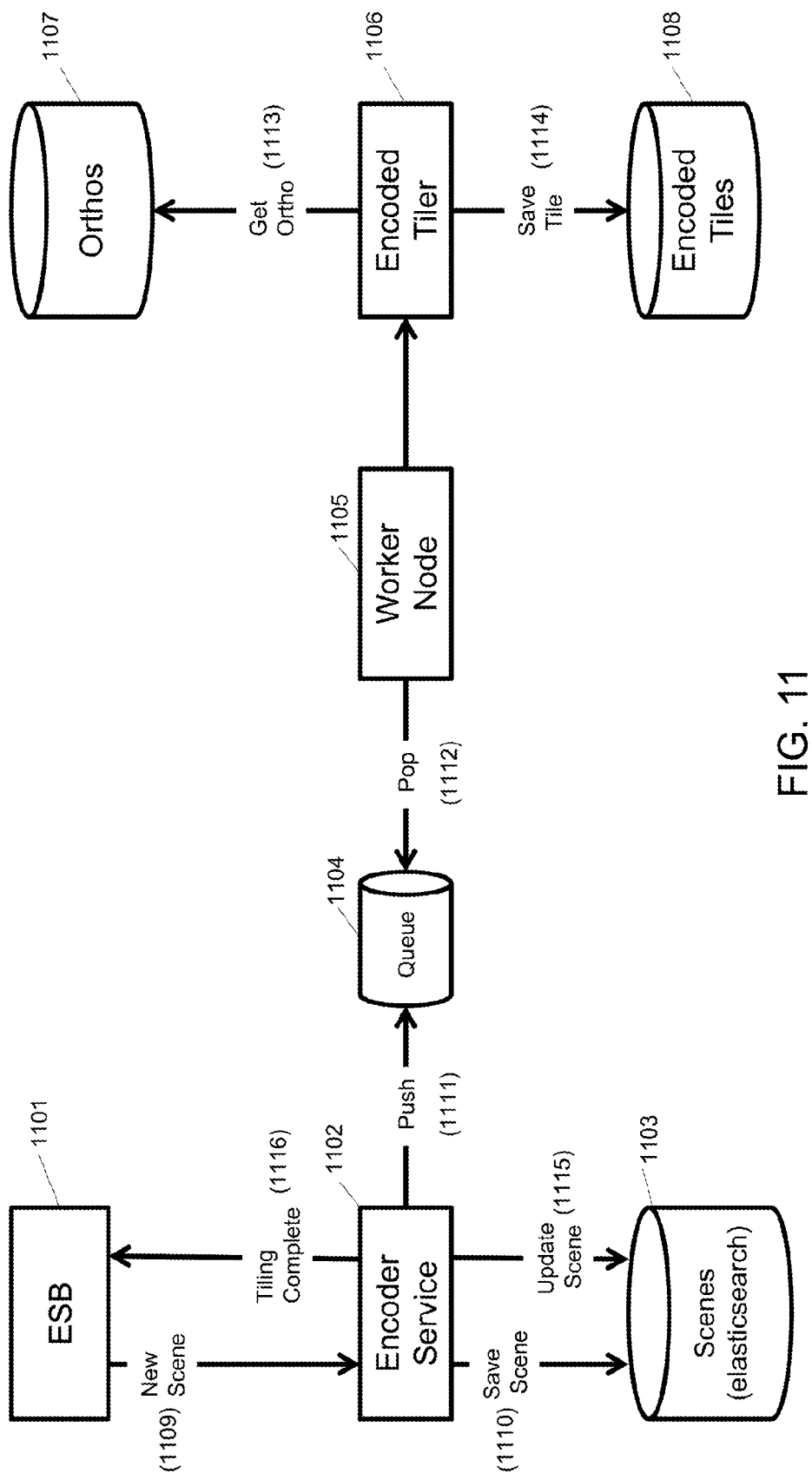
FIG. 11 is an example system diagram of a computing system for generating encoded tiles.

Turning to FIG. 11, example components of an encoder service, or ETS, are provided. It includes an ESB 1101, an encoder server 1102 (also called an encoder service module), a database or storage system for storing scenes 1103, a queue database or storage system 1104, a worker node 1105, an encoded tiler 1106, a database or storage system for storing orthos 1107, and a database or storage system for storing encoded tiles 1108. It will be appreciated that these components are implemented as one or more computing devices. Some of these components may coincide with the components mentioned above, although are shown again renumbered so as not to distract from the example embodiments described below. It will be appreciated that FIG. 9 describes the system boundary conceptually, whereas FIG. 11 illustrates that worker nodes are used to scale the processing per ETS machine node.

From the ESB 1101, the encoder service module 1102 receives a new scene, or an address to obtain the new scene, for processing (1109). The encoder service module initiates storage of the scene data in the database 1103 (1110) As noted above, the inputted scene data include pixel dimension of the image, geo reference locations, ortho rectified data, data identifying various bands of wavelengths (e.g. NIR, ultra blue, etc.) with individual bands represented as separate images, and color spacing. A color space is a specific organization of colors. In combination with physical device profiling, it allows for reproducible representations of color, in both analogue and digital representations. A color space may be arbitrary, with particular colors assigned to a set of physical color swatches and corresponding assigned names or numbers When the encoder service module finishes encoding the scene data, the encoder service pushes the encoded scene data to the queue 1104 (1111). When the worker node 1105 generates a POP operation on the queue 1104 (1112), encoded scene data in the queue is returned to the worker node.

The worker node 1105 sends the scene data to the encoded tiler 1106, and the encoded tiler processes the scene data to generate encoded tiles. For example, the encoded tiler takes one or more images of the scene and divides the one or more images into tiles. Different bands of the image are also represented as individual tiles. The process of generating the encoded tiles includes obtaining the ortho rectified images from the ortho database 1107 (1113).

After generating the encoded tiles, the encoded tiles are saved in the encoded tiles database 1108 (1114).

After the scene has been encoded into encoded tiles, the status about the scene is sent to the encoder service module 1102, and the encoder service updates the status of the scene in the scene database 1103 (1115).

The encoder service module 1102 may also sends a message to the ESB 1101 indicating that the tile encoding is complete (1116).

Figure 12:
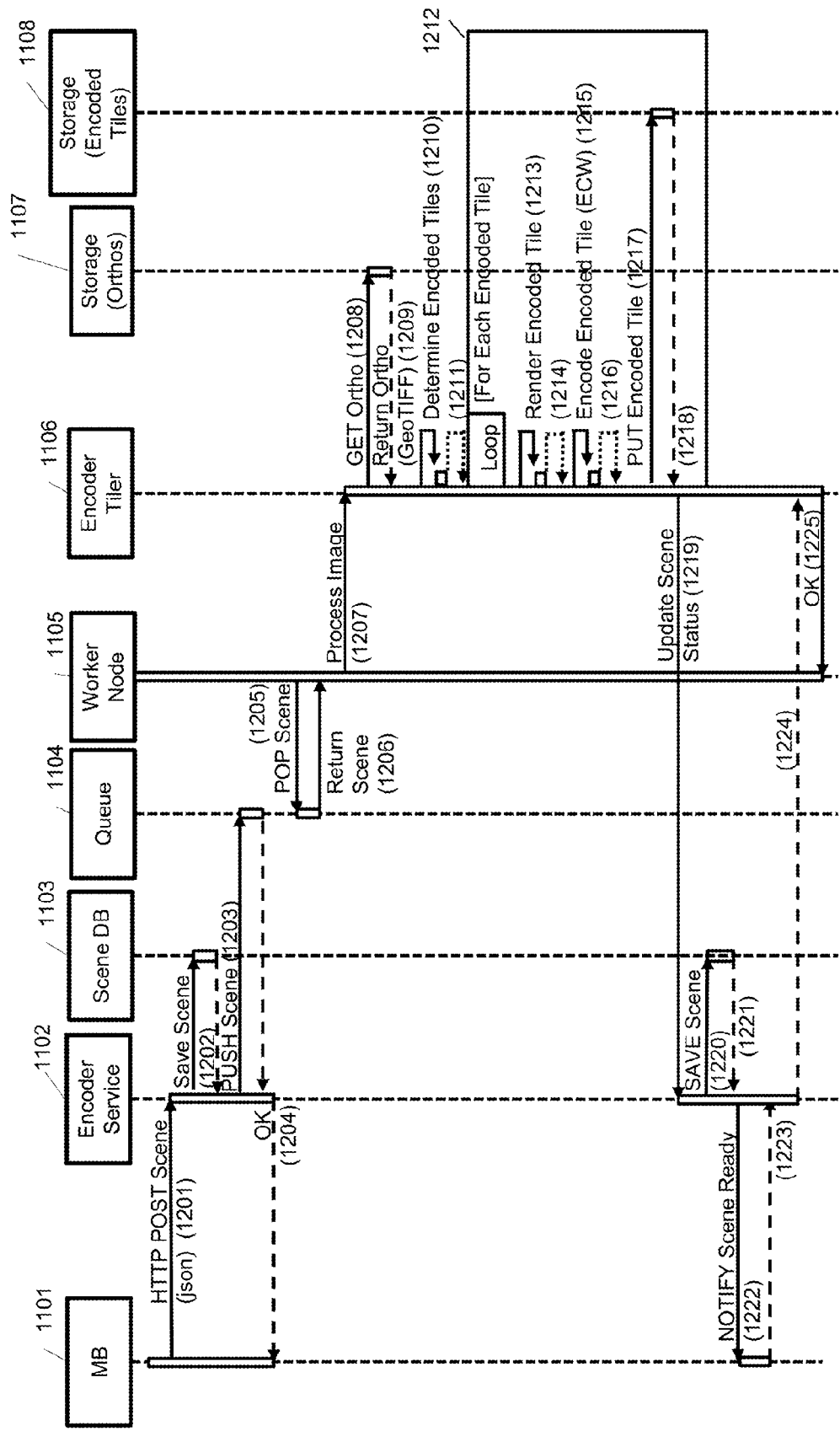
FIG. 12 is a flow diagram illustrating example computer executable or processor implemented instructions for encoding images to generate encoded tiles.

Turning to FIG. 12, example computer executable instructions or processor implemented instructions are provided for performing image encoding to generate the encoded tiles. The instructions are performed by the components described in FIG. 11 and the reference numerals for the components in FIG. 12 reflect the same numbering used in FIG. 11.

In particular, in FIG. 12, the ESB sends the address or link of a scene to the encoder service module (1201). In a particular example of operation 1201, the ESB sends an HTTP POST scene (json format). It is appreciated that POST is an example of a request method supported by the HTTP protocol used by the World Wide Web and is designed to request that a Web server accept the data enclosed in the request message's body for storage.

After operation 1201, the encoder service module saves the scene in the scene database (1202), and the scene database sends a confirmation to the encoder service module that the scene has been saved.

Also after operation 1201, the encoder service module pushes the scene to the queue (1203). The queue may send a confirmation to the encoder service module that the scene has been added to the queue.

The encoder service module may send a conformation to the ESB indicating that the scene has been processed and placed in a queue (1204).

Continuing with FIG. 12, the worker node sends a message to the queue to invoke the queue to return a scene (1205). In an example embodiment, the message is a Pop scene, which removes it from the queue.

Responsive to operation 1205, the queue returns a scene that is stored within the queue (1206).

The worker node sends the scene the encoding tiler (1207). The worker node may send a command along with the scene instructing the encoding tiler to process the image.

After obtaining the scene, the encoded tiler sends a request to the ortho database to obtain one or more orthorectified images corresponding to the scene (1208). The request of operation 1208 may be a GET scene command.

After operation 1208, the ortho database sends the ortho or orthos to the encoded tiler (1209). In an example embodiment, the ortho or orthos are in a GeoTIFF format.

The encoding tiler then determines the tiles (1210) that require encoding based on where the scene falls within the map grid. The output is the X,Y coordinates of the tile area to be encoded.

The encoded tiler may generate a confirmation message for itself that the encoded tiles have been determined (1211).

A process 1212 is then performed for each of the encoded tiles associated with the scene. In particular, the process 1212 loops or is repeated for each encoded tile.

In the process 1212, the encoding tiler renders a given encoded tile (1213) and may generate a confirmation when the rendering for the given encoded tile is complete (1214), by using the scene ortho, and coordinates from 1210 and cuts that out of the scene the area to be encoded. The output is the encoded tile stored in the database 1216 and the confirmation message when the operation is complete 1215.

After the given encoded tile is encoded, the encoded tiler sends the given encoded tile to the encoded tiles database for storage (1217). Operation 1217 may be a PUT command sent to the encoded tiles database. The encoded tiles database may send a confirmation to the encoded tiler indicating that the given encoded tile has been stored (1218).

After process 1212 is complete for all the encoded tiles associated with the scene, the encoding tiler sends an update regarding the scene status to the encoder service module (1219).

The encoder service module saves the scene in the scene catalog database (1220). A confirmation that the scene has been updated may be sent from the scene database to the encoder service module (1221).

After operation 1220, the encoder service module sends a notification to the ESB notifying that the scene is ready for example, so that the MTS can perform operations (1222). A confirmation from the ESB may be sent to the encoder service module indicating that the notification has been received (1223).

Responsive to the confirmation in operation 1223, the encoder service module may send a confirmation to the encoded tiler indication that the ESB has been notified that the scene is ready (1224).

Responsive to the received confirmation in operation 1224, the encoding tiler may send a confirmation to the worker node that the scene is also ready (1225), in order to ensure the queue is cleared of existing encoding jobs for the encoding tile job.

Figure 13:
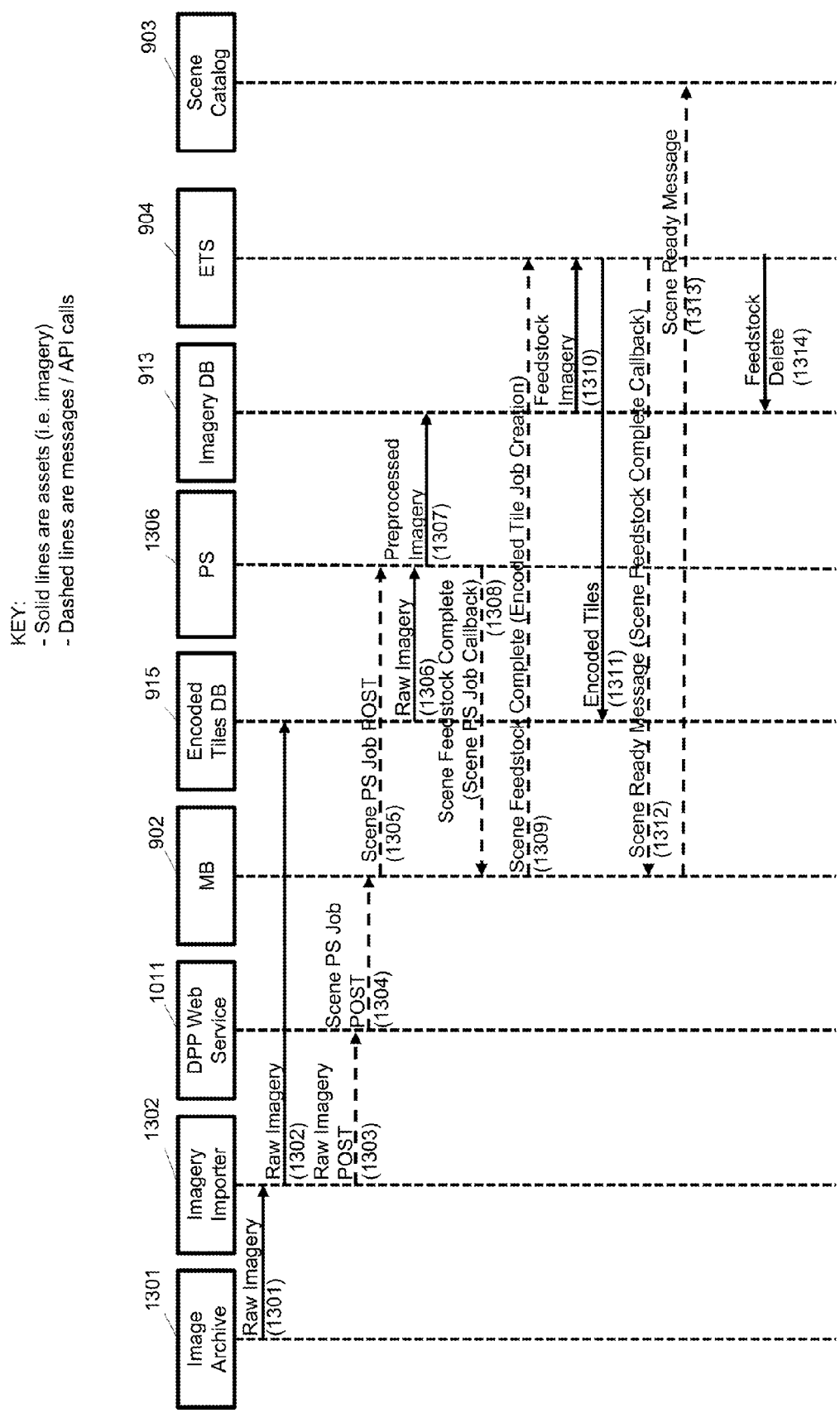
FIG. 13 is a flow diagram illustrating example computer executable or processor implemented instructions for performing an encoded tile service, including generating encoded tiles.

Turning to FIG. 13, another example of computer executable instructions or processor implemented instructions are provided for generating the encoded tiles from the archive. The instructions are performed by the components described in FIGS. 9 and 10 and the reference numerals for the components in FIG. 13 reflect the same numbering used in FIGS. 9 and 10.

In FIG. 13, the solid arrow lines represent the transmission of imagery and data assets, while the dotted or dashed arrow lines represent the transmission of messages or API calls, or both.

The image archive database that stores raw imagery (Level 0 imagery) and metadata, sends raw imagery to the imagery importer (1301).

The imagery importer sends the raw image to the encoded tiles database (1302). The imagery importer also sends a raw imagery HTTP POST message to the DPP Web service (1303).

In turn, the DPP Web service sends a scene PS job HTTP POST message to the ESB (1304). This invokes the ESB to send the scene PS job HTTP POST message to the processing system (1305).

The processing system also obtains the raw imagery from the encoded tiles database (1306).

After operations 1305 and 1306, the processing system pre-processes the raw imagery. The processing system then sends the preprocessed imagery to the imagery database (1307). The processing system also sends a message to the MB indicating that the scene feedstock is complete (1308). This message to the MB may be a scene PS job callback url that the message is sent to.

In response to operation 1308, the MB sends a message to the ETS also indicating the scene feedstock is complete (1309). For example, this message to the ETS is a command or message that invokes encoded tile job creation.

Responsive to the operation 1309, the ETS obtains the feedstock imagery, or pre-processed imagery 1307, from the imagery database (1310).

The ETS then generates encoded tiles. This process is explained above with respect to FIGS. 11 and 12.

The ETS sends the encoded tiles to the encoded tiles database (1311). The ETS also sends a message to the MB indicating the scene is ready (1312). For example, the message is a scene feedstock complete message to the callback url.

Responsive to operation 1312, the MB then sends the scene ready message to the scene catalog (1313). The message in operation 1313 may include details about the scene and encoded tile(s).

As part of operation 1312, the ETS system deletes feedstock from the imagery database (1314). This operation makes memory space available.

Generating and Distributing Map Tiles (Using the MTS)

The purpose of the MapTile Service (MTS) is to create images from source encoded tiles according to a number of control parameters. Requesting a specific map tile may use any number of encoded tiles, and may perform a number of transforms on the image to produce the desired result. The images may be requested in a number of formats, such as JPEG, PNG or TIFF.

There are several APIs that may be used with the MTS, although not shown in the figures, including a service API and a layer API.

The service API defines the actual query capabilities of the MTS using the scene catalog and other data stored to be used within the context of a map. Map tile query services include filtering by scene metadata e.g. cloud cover, sun angle, time of day, time of capture, sensor type, sensor name, zoom level, spectral bands. Another type of service is a data service in which the MTS can return georeferenced data points which can be used in the context of a map.

The layer API implements a specific service from the service APIs which allows a client to change how the data may look and behave. For example, one type of layer might show specific satellite imagery that is cloud free for a specific time sequence on a map. Another example of a layer service would be the Normalized Difference Vegetation Index (NDVI) service.

As explained above, a map tile is a merged file of several encoded tiles. In an example embodiment, a map tile is a single image produced from the MTS. In an example embodiment, the map tile is a 256 pixel by 256 pixel image created in a number of image formats. Other pixel dimensions may be used.

In an example embodiment, a map tile is composed of overlaid unmerged map tiles and includes metadata about semantic artifacts within the imagery. For example, the metadata about the semantic artifacts include borders, location labels and geological features. The metadata about the semantic artifacts may be generated dynamically b a service without being stored persistently as a file. In an example embodiment, the map tile is at a lower compression quality than an unmerged map tile and is watermarked.

An unmerged map tile is an image file that is generated, for example, from a subsection of an image strip after basic processing (e.g. color correction, Web-mercator projection, etc.). "Unmerged" specifically refers to the fact that gaps, edges or otherwise non-existent imagery is represented as transparent pixels. In an example embodiment, the format of the unmerged map tile is PNG and the transparent pixels are encoded to have an opacity level of 0. In an example embodiment, the unmerged map tile is 256×256 pixels. In another example embodiment, the unmerged map tile is at a higher compression quality than a map tile, and is not watermarked.

An image strip is considered an individual strip of imagery (e.g. Earth imagery) that is bounded by a closed polygon. The individual strip of imagery is, for example, captured operationally by a camera system such as on the International Space Station, or obtained from a third-party source (e.g. vendor, partner, community user, etc.).

With respect to the service interface, requests include a tile request, an interceptor, a service aspect and a layer.

In particular, the tile request encapsulates details of a requested tile, including the xyz coordinates, the service type and the layer type. With respect to the x,y,z coordinates, x represents horizontal coordinate of a tile relative to the zoom level z. y represents the vertical coordinate of the tile relative to the zoom level z. z represents the zoom level of the requested tile imagery.

In an example embodiment of the x,y,z coordinates, the possible values of x include the range $[0, (2^z-1)]$. The possible values of y include the range $[0, (2^z-1)]$. The possible values of z include the range $[0, 18]$, where 0 represents the maximum zoom-out level and is configured to show an entire planet in one tile. It can be appreciates these ranges are an example and the values of the coordinates may be expressed in different ways.

The interceptor acts as a filter to the request. It may be used for censoring certain images depending on an access control list, such that a request from a client from a geo region or a user that is not allowed to view a particular set of imagery. The imagery would either be blurred, time-delayed, or otherwise degraded in quality.

The service aspect produces map tiles from the encoded tiles by combining different parts of images and metadata. The end result is a map tile.

The layer implements a specific processing done to one or more encoded tiles. Layers depend on the scene, such that specific processing may only be applied to certain imagery e.g. NDVI, Carbon index, aerosol indexes, and other related processing techniques.

In a general example embodiment of a process for merging encoded tiles to generate a map tile, the input to the process includes a layer specification (e.g. ID, query, etc.) and tile coordinates (e.g. x,y,z coordinates). Non-limiting example embodiments of a layer specification includes information identifying any one or more of a time range, a percentage of cloud cover, a percentage of snow cover, a sun angle, and a specific sensor.

The output of the process is a map tile encoded according an image format. Non-limiting examples of image formats include PNG, JPEG and WebP.

The process itself includes searching the encoded tiles catalog to find encoded tiles that are relevant to the input. After identifying the relevant encoded tiles, the encoded tiles are obtained from storage. In some cases, additional visualization processing is applied to the obtained encoded tiles. The obtained encoded tiles (e.g. or further processed encoded tiles) are rendered by mosaicking the encoded tiles together to form a map tile. The map tile, for example, is a single image. For example, when merging or mosaicking the encoded tiles, the orientation of the encoded tiles are re-aligned with each other. The map tile is then encoded and returned to the device or party that requested the map tile.

In the above example process, additional visualization processing may be used depending on the input (e.g. layer specifications and coordinates) and the obtained relevant encoded tiles. It is herein recognized that the encoded tiles may include data from different types of sensors and sources and, therefore, the data formats and types of data may be different between different encoded tiles. For example, a first encoded tile for one geographic area is captured by one image sensor, while a second encoded tiles for an adjacent geographic area (or partially overlapping geographic area) is captured by a different image sensor. The first encoded tile and the second encoded tile need to be normalized according to the layer specifications, as well as stitched together to remove "seam" artifacts.

In another example of additional visualization processing, an obtained encoded tile with coordinates matching the inputted coordinates includes data from non-visible bands (e.g. data from a SAR). The additional visualization processing includes adding false color to represent those non-visible bands. For example a hill in an image is falsely colored green.

In another example of additional visualization processing, an encoded tile of an RGB image and an encoded tile of a NIR image are combined or merged to create a map tile representative of a vegetation index, as per the inputted layer specification. The combined image in the map tile may be falsely colored to clearly show the features of the vegetation index. For example, the red band is falsely colored as blue. The NIR band is falsely colored as green. In this way, the vegetation index is represented as a blue-green image.

Figure 14:
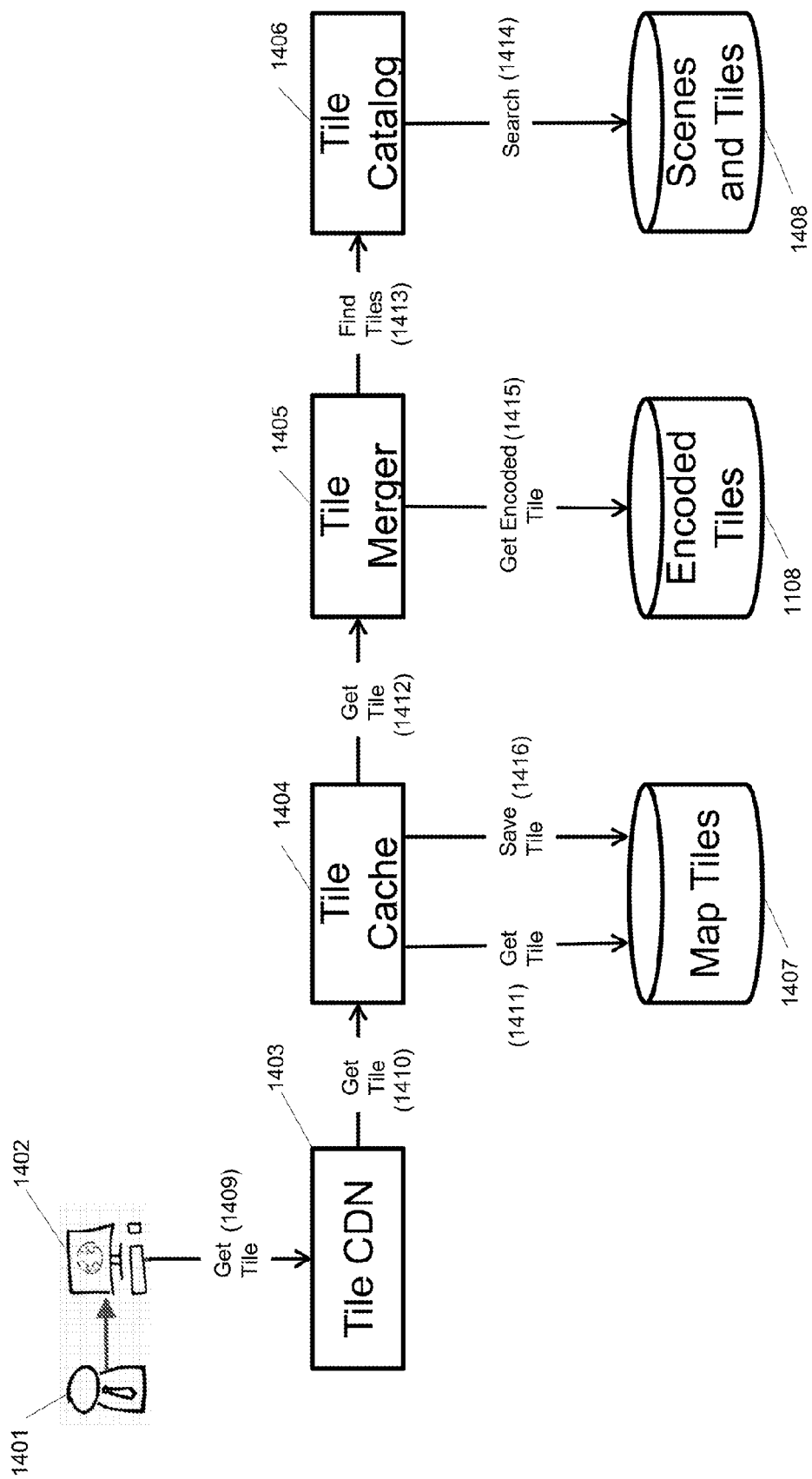
FIG. 14 is an example system diagram of a computing system for generating map tiles.

Turning to FIG. 14, example components in a system for a map tile service are shown. A user 1401 is shown using a user computing device 1402, and the user computing device 1402 is in data communication with a tile CDN 1403. Other components in the system include a tile cache 1404, a tile merger module 1405 and a tile database module 1406.

Other components include a map tiles database 1407, an encoded tiles database 1108 and a scenes and tiles database 1408. In an example embodiment, the scenes and tiles database 1408 is implemented by a search server available under the trade name Elasticsearch. In an example embodiment, the tile cache 1404 is in communication with the map tiles database 1407, the tile merger module 1405 is in communication with the encoded tiles database 1108, and the tile catalog 1406 is in communication with the scenes and tiles database 1408. The scene database contains all the metadata about the scene, whereas the tiles database contains the actual tile imagery.

Some of these components in FIG. 14 may coincide with the components mentioned above, although are shown again renumbered so as not to distract from the example embodiments described below.

Continuing with FIG. 14, the user computing device 1402 sends a request 1409 to the tile CDN 1403. The request may include the layer specification(s) and x,y,z coordinates, or may include information used derive the layer specification (s) and x,y,z coordinates. For example, the tile CDN 1403, the tile cache 1405, the tile merger 1405 or the tile catalog 1406 may use the information provided by the user computing device to derive the layer specification(s) and the x,y,z coordinates. In an example embodiment, a graphical user interface displayed at the user computing device allows a user to generate a request for a map tile.

The tile CDN 1403 receives the request from the user computing device. It is appreciated that the tile CDN 1403 is configured to receive multiple requests from multiple user computing devices, for example, over an Internet network.

The tile CDN 1403 sends the map tile request 1410 to the tile cache 1404. The tile cache determines whether or not a map tile matching the request has already been generated and stored in the map tiles database 1407. If a map tile is stored in the database 1407 and matches the request, then the tile cache 1404 retrieves the map tile 1411 from the database 1407. The retrieved map tile is then returned to the user computing device 1402 via the tile CDN 1403. It is appreciated that the operation 1411 is relatively quick and saves time and processing resources compared to generating a map tile in response to the request.

However, if the tile cache 1404 determines that no map tile is stored in the database 1407 that matches the request, then the tile cache 1404 sends the request for the map tile 1412 to the tile merger module 1405.

In another example embodiment, the tile CDN 1403 simply sends the map tile request directly to the tile merger module 1405, without sending the map tile request to the tile cache.

Continuing with FIG. 14, after the tile merger module 1405 receives the request, the module 1405 sends a command 1413 to the tile catalog 1406 to initiate a search for encoded tiles and scenes that are relevant to the request. The command would include the layer specification(s) and the x,y,z coordinates. The tile catalog 1406 then performs a search for scenes and tiles that match the layer specification(s) and the x,y,z coordinates associated with the map tile request.

After identifying the relevant scenes and tiles, and the associated encoded tiles, the tile catalog 1406 sends the IDs of the associated encoded tiles to the tile merger module 1405. The tile merger module uses the IDs of the associated encoded tiles to retrieve the actual encoded tiles 1415 from the encoded tiles database 1108.

The tile merger module 1405 may then perform additional visualization processing to the retrieved encoded tiles, depending on the map tile request and the encoded tiles.

The tile merger module 1405 merges the encoded tiles together to form a map tile. The map tile is then returned to the user computing device 1402 via the tile CDN 1403. The map tile may also be returned to the tile cache 1404, and the tile cache may store the map tile 1416 in the map tiles database 1407 for possible future retrieval.

Figure 15:
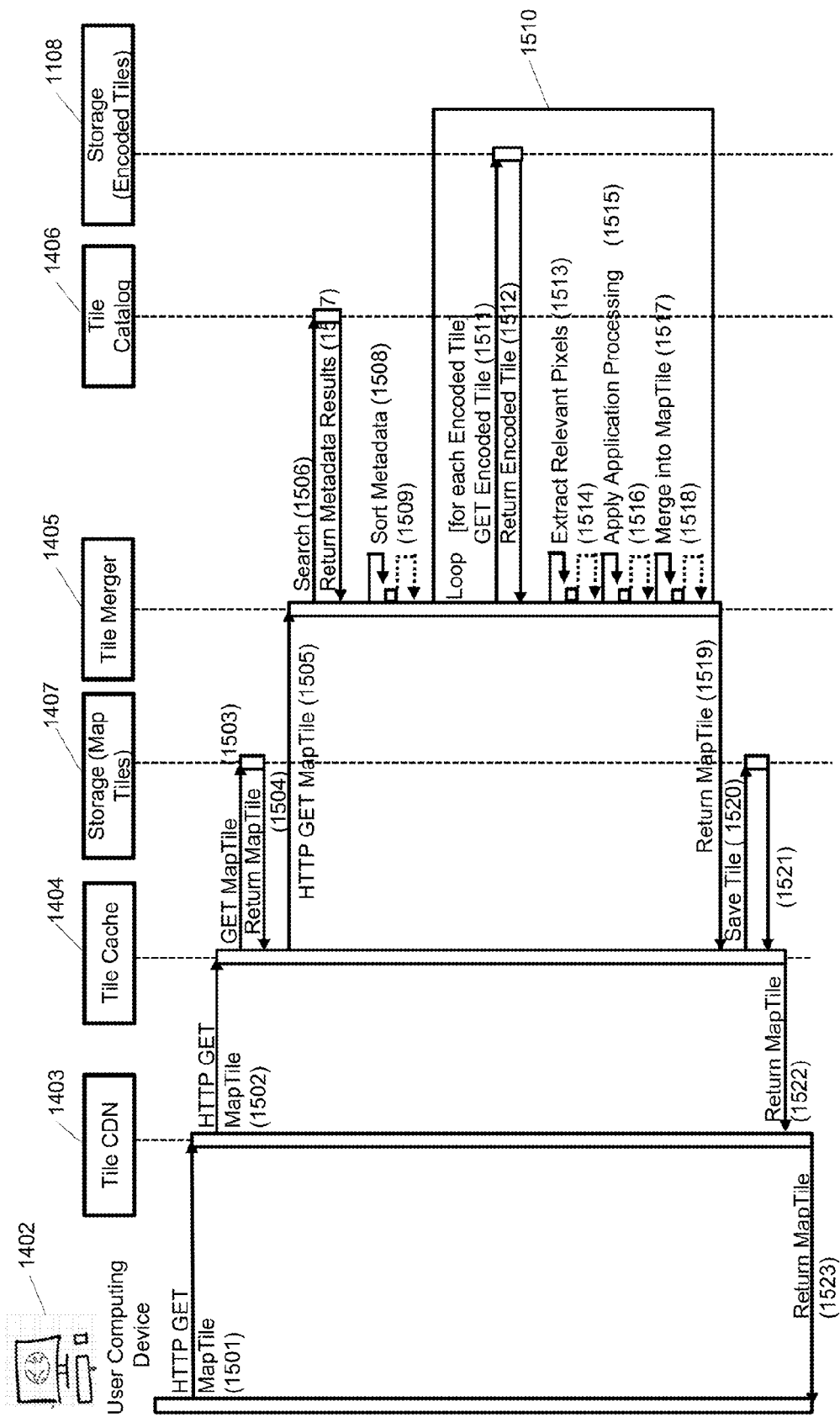
FIG. 15 is a flow diagram illustrating example computer executable or processor implemented instructions for merging encoded images to generate and render map tiles.

Turning to FIG. 15, example computer executable instructions or processor implemented instructions are provided for forming and obtaining a map tile. The instructions are performed by the components described in FIG. 14 and the reference numerals for the components in FIG. 15 reflect the same numbering used in FIG. 14.

In particular, in FIG. 15, a user computing device sends a command to the tile CDN, where the command is a request for a map tile (1501). For example, the command is HTTP GET map tile. The tile CDN then sends the command to the tile cache (1502). In turn, the tile cache sends the command to the map tiles database (1503). The map tiles database returns the map tile, if the map tile is stored in the map tiles database (1504).

If the tile cache determines that the requested map tile is not stored in the map tiles database, then the tile cache sends the command to the tile merger module (1505). For example, the command is in the form of HTTP GET map tile.

After operation 1505, the tile merger module initiates a search of the tile catalog (1506). The tile catalog performs the search on intersecting polygon data from the query, with additional filters on metadata fields, and returns metadata results to the tile merger (1507

The tile merger then sorts the metadata (1508). A confirmation that the metadata has been sorted may be generated (1509).

In an example embodiment, the metadata is used to identify encoded tiles that are relevant to forming a map tile, and if so a map tile is formed from one or many encoded tiles.

For example, a process 1510 is performed for each given encoded tile. In other words, the operations in the process 1510 is looped or repeated for each given encoded tile.

Within the process 1510, the tile merger issues a command to obtain a given encoded tile from the encoded tiles database (1511). The encoded tiles database then returns the given encoded tile to the tile merger (1512).

The tile merger then extracts relevant pixels from the given encoded tile or tiles from the search query (1513). A confirmation may be generated that the relevant pixels have been extracted (1514).

The tile merger may also perform application processing on the given encoded tile, or may perform processing on just the extracted relevant pixels (1515). A confirmation may be generated that the application processing has been completed (1516).

After being processed, the given encoded tile is, or the extracted relevant pixels of the given encoded tile are, used to form an initial part of the map tile (1517). Or in subsequent iterations of process 1510, the given encoded tile is, or the extracted relevant pixels of the given encoded tile are, merged into the map tile. Merging tiles includes looping through the required range of the encoded tiles, reading in each tile and placing it into the larger map tile image. Usually the encoded tiles are placed at the top left corner of the larger map tile image at the specified coordinates, and each tile will be placed at the coordinates (X*tilesize, Y*tilesize) where X, Y ranges from zero to the number of tiles in X or Y direction.

A confirmation may be generated indicating that the merging of the given encoded tile has been completed (1518).

After the relevant encoded tiles, or data from the relevant encoded tiles, have been merged to form the map tile, the tile merger returns the map tile to the tile cache (1519). The tile cache saves the map tile in the map tiles database (1520). A confirmation may be generated indicating that the map tile has been saved in the map tiles database (1521).

The tile cache then sends or returns the map tile to the tile CDN (1522), and the tile CDN in turn sends or returns the map tile to the user computing device (1523).

Figure 16:
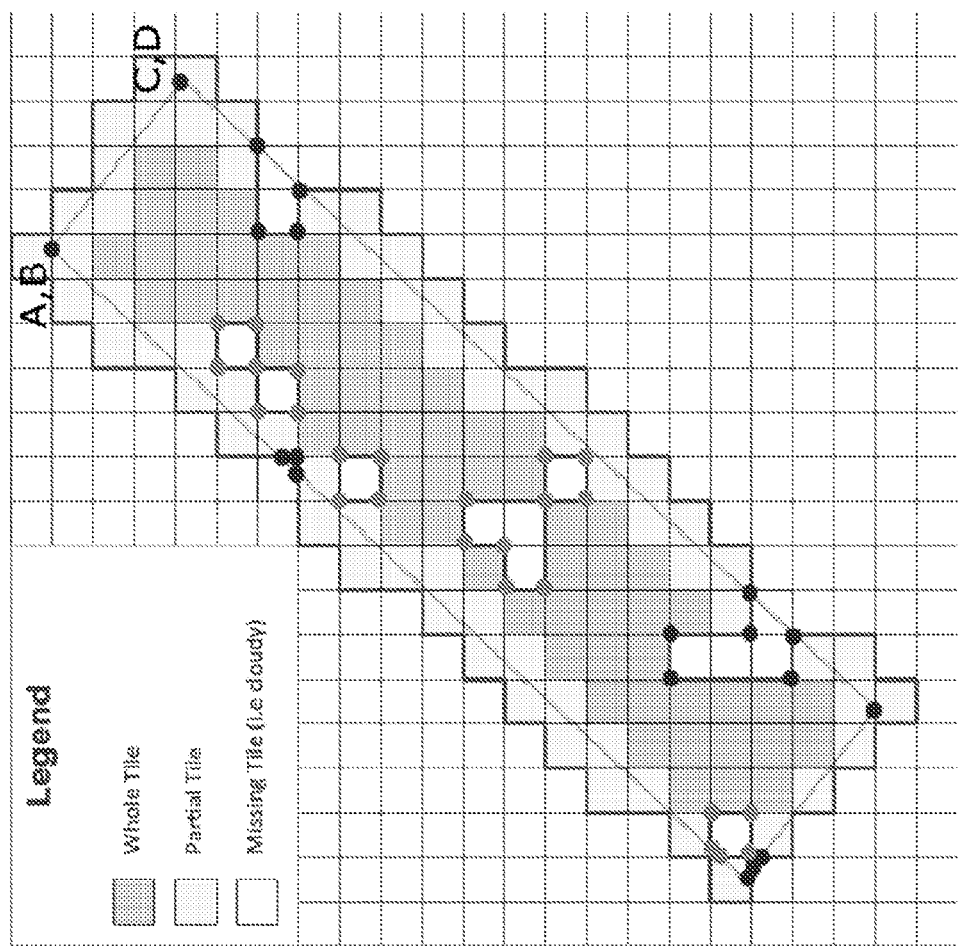
FIG. 16 is a schematic diagram that describes how an image scene is divided into encoded tiles and rendered into map tiles for a specified polygon.

Turning to FIG. 16, it is important to note that "holes" or null image data can be specified in the boundaries via geoJSON. For example, the boundaries defined can have missing or blank imagery which results in the following shape. Note that neither strips nor holes must follow the tile grid (as shown in this example for simplicity). Any polygon may be represented.

In another aspect of the MTS, map tiles may be organized by certain attributes. Based on certain attributes a map skin is generated. A map skin refers to a subset of all map tiles with one or more predefined visual image attributes in common. For example, there is a map skin for all map tiles having a same season; there is a map skin for all map tiles having a certain amount of day light; and there is a map skin for all map tiles having a certain amount or percentage of cloud coverage.

In another aspect of the MTS, a notification service module (not shown in the figures) is included that is configured to send notifications to users about potential or already generated map tiles based on certain subscription parameters. For example, a user may wish to subscribe to updates for map tile information about a specific region, and receive updates when an event occurs within the specific region. Or a user may subscribe to updates for map tile information about a specific topic or event, so that a notification is sent to the user any time news about the topic or event is detected. It is appreciated that notification service module has access to the Internet, Web media, social networks, and online news sources.

For example, a user may subscribe to the notification service for the topic "flood". When the notification service module detects news for a flood, the notification service module sends a notification to the user that a map tile for the location of the flood (e.g. before, during or after, or combinations thereof) is available.

In another example, when the notification service module detects news for a flood, the notification service module automatically generates a map tile request for the location of the flood, but does not immediately issue the map tile request as a command. Instead, the notification service module sends a notification to the user that includes the automatically generated map tile request for the user's consideration. The user provides a confirmation to send the map tile request to the MTS. In turn, the MTS goes through the process of computing a map tile for the location of the flood, based on the map tile request. In this way, the user is able to easily and conveniently obtain map tiles for locations, times and specific data in which the user is interested.

Figure 17:
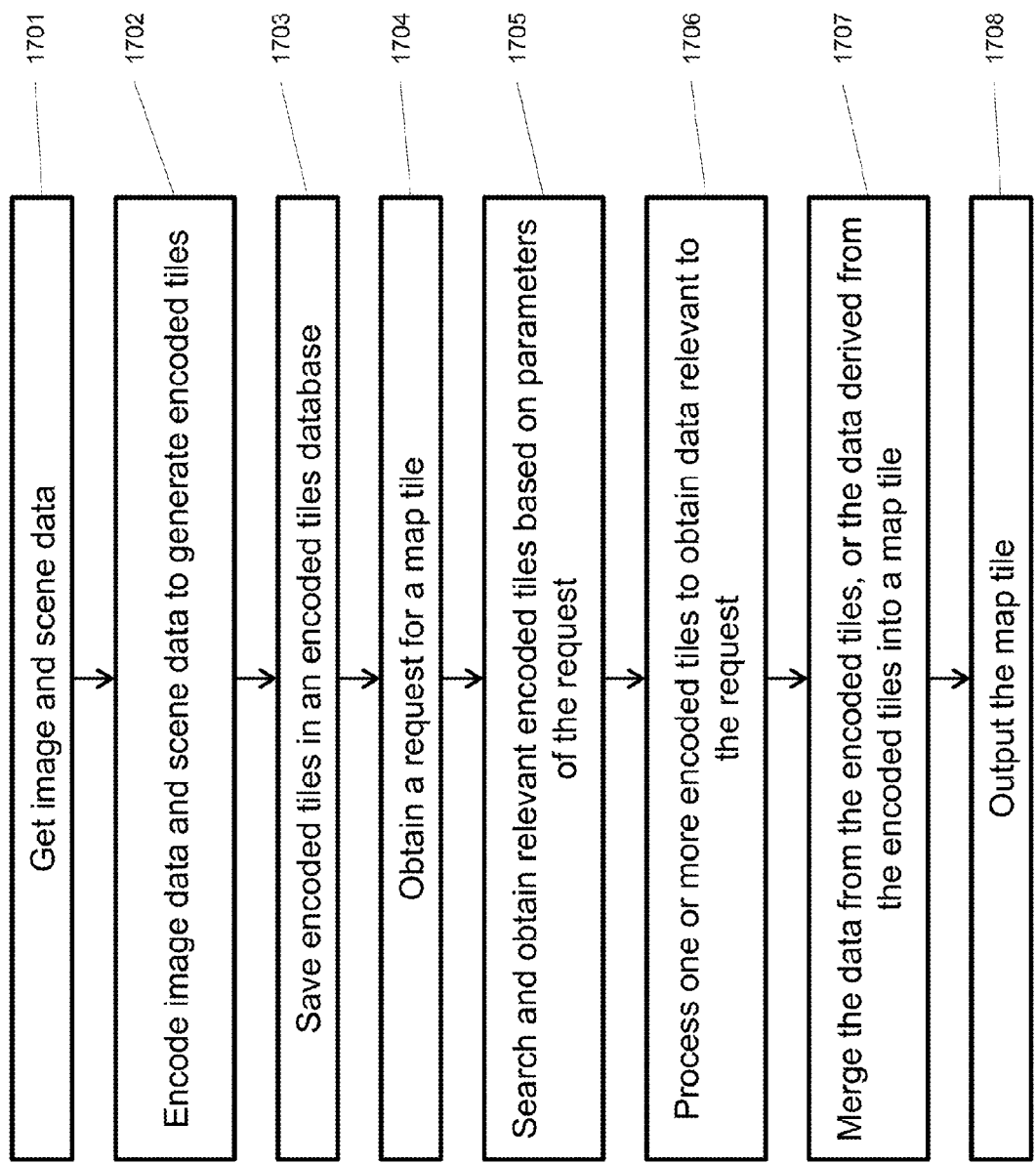
FIG. 17 is a flow diagram illustrating example computer executable or processor implemented instructions for generating encoded tiles and merging the encoded tiles to generate a map tile.

Turning to FIG. 17, example computer executable instructions or processor implemented instructions are provided for processing and distributing earth observation images. The example is a general example embodiment based on the above principles, and shows an overall process.

In particular, at block 1701, a computing system obtains an image and scene data, such as metadata associated with a scene. At block 1702, the computing system encodes the image and scene data to generate encoded tiles. The encoded tiles are saved in an encoded tiles database (block 1703).

Continuing with FIG. 17, the computing system receives a request for a map tile (block 1704). The request may include location coordinates and other details related to the map tile (e.g. layer specification(s)). At block 1705, the computing system searches and obtains encoded tiles that considered relevant to the parameters of the request.

At block 1706, the computing system processes one or more encoded tiles to obtain data relevant to the request. Block 1706 in some cases is optional. For example, additional data may be derived from a given encoded tile. In another example, a portion of data from the encoded tile may be extracted. In another example, data from the encoded tile is modified or transformed.

At block 1707, the computing system merges the data from the encoded tiles, or data derived from the encoded tiles, into a map tile. The map tile is then outputted at block 1708.

In another example embodiment of the overall image processing, the process includes (1) generating unmerged encoded tiles, (2) performing on-the-fly merging and (3) performing off-line merging.

In the generation of the unmerged encoded tiles, the processing system receives new geo-located image or video. The processing system will generate an ortho or orthomosaic product in the Web Mercator map projection, with the pixels and lines aligned with the tile grid. A tiling process will be applied to the newly generated ortho or orthomosaic, and as each encoded tile is cut, it is encoded and pushed to the specified storage destination (i.e. local disk, S3, etc.).

In the process of performing on-the-fly merging, the Web Platform or the API displays a 2D area of merged map tiles at some zoom level corresponding to the current viewing window (e.g. in the GUI), subject to various criteria (e.g. cloud cover, sun angle, etc.) and expressed in some visualization method (e.g. RGB radiance, RGB reflectance, NDVI, etc.). In order to achieve this, the Web Platform or the API makes a request of the tile merger for the required merged map tiles that cover this 2D area.

The MTS first places a query (e.g. to Elastic Search) to determine which scenes are needed to generate the merged map tiles to cover this 2D area. The query returns a list of scenes that satisfy the specified criteria (e.g. cloud cover, sun angle, etc.). This list is passed to the MTS.

The MTS retrieves the encoded tiles it will use to form the map tiles from storage, merges the map tiles together, and applies the requisite visualization method processing, resulting in a mosaicked image.

A tiling process will be applied to the newly generated mosaicked image, and as each merged map tile is cut, it is JPEG, PNG or WebP encoded and pushed to the specified storage destination (e.g. local disk, S3, etc.).

After the JPEG, PNG or WebP encoded merged map tiles have been stored, the MTS returns their URLs to the Web Platform.

Continuing with the example, with respect to the process of off-line merging, additional processes are performed following operational procedures. In off-line merging, a goal is to pre-generate large 2D areas of merged map tiles at some range of zoom levels, subject to various criteria (e.g. cloud cover, sun angle, etc.) and expressed in some visualization method (e.g. RGB radiance, RGB reflectance, NDVI, etc.). In order to achieve this goal, a request of the MTS is generated requesting the merged map tiles that cover the desired 2D area.

The MTS first places a query (e.g. to Elastic Search) to determine which scenes are needed to generate the merged map tiles to cover the desired 2D area. The query returns a list of scenes that satisfy the specified criteria (e.g. cloud cover, sun angle, etc.). This list is passed to the MTS.

The MTS retrieves the encoded tiles from storage, merges the encoded tiles together, applying the requisite visualization method processing, which results in a mosaicked image.

A tiling process will be applied to the newly generated mosaicked image, and as each merged map tile is cut, it is JPEG, PNG or WebP encoded and pushed to the specified storage destination (e.g. local disk, S3, etc.).

Both the MTS and the tiling process are potential candidates to take advantage of the Elastic Map Reduce (EMR) service for handling large 2D areas involving computationally intensive operations.

After the JPEG, PNG or WebP encoded merged map tiles have been stored, the MTS later serves them to the Web Platform.

It will be appreciated that systems and methods, including computer algorithms, are provided herein relating to remote sensing. An Earth observation platform is also provided, which can obtain imagery, video, and other remote sensing data of the Earth or objects intentionally placed into orbit of planetary objects. The remote sensing data may also be obtained from the International Space Station, other manned (spacecraft, aircraft), or unmanned aerial vehicles (UAVs, spacecraft probes). A sensor captures observation data and transmits the data to ground stations on the Earth. The ground stations receive the Earth observation data. An archiving system stores the sensor observation data. Customers or users use an order management system to place orders for the observation data, which specify processing parameters for the Earth observation data. Based on the orders, a processing system retrieves the Earth observation data from the archiving system and processes the Earth observation data according to the parameters to generate an Earth observation data product. This system provides unique tools for searching, browsing, and analyzing the data as well as capabilities for interacting with the system through an API. The system is configured to combine observation data (e.g. remote sensing data) from sources produced internally by the observation platform and by third parties.

General example embodiments of the systems and methods are provided below. Example aspects are also provided.

In a general example embodiment, a method performed by a computing system for processing observation data, is provided. The method includes: obtaining images and metadata associated with the images; encoding the images and the metadata to generate encoded tiles; storing the encoded tiles in an encoded tiles database; receiving a request for a map tile; searching the encoded tiles database and obtaining the encoded tiles that are relevant to the request; merging data from the encoded tiles into the map tile; and outputting the map tile.

In an aspect, the images are of Earth.

In another aspect, the metadata includes any one or more of: sensor data associated with a sensor that captured the images; season data at which time the images were captured; local time of day at which the images where captured; sun angle data associated with time and location of the images; cloud cover percentage within the images; snow cover percentage within the images; water cover percentage within the images; and land cover percentage within the images.

In another aspect, the request for the map tile includes x, y, z coordinates, wherein z represents a zoom level, x represents horizontal location coordinates relative to the zoom level, and y represents vertical location coordinates relative to the zoom level.

In another aspect, the request includes layer specifications, including any one or more of: cloud cover, snow cover, water cover, land cover, vegetation index, sensor data, sun angle, and local time of day.

In another aspect, the method further includes, after obtaining the encoded tiles from the encoded tiles database, extracting a portion of pixels from the encoded tiles to be merged into the map tile.

In another aspect, the method further includes, after obtaining the encoded tiles from the encoded tiles database, modifying one or more visual aspects of the encoded tiles, and merging the modified given encoded tiles into the map tile.

In another aspect, one or more colors of the encoded tiles are modified.

In another aspect, the encoded tiles include imagery from different sensors and the method further comprising normalizing the encoded tiles prior to merging the encoded tiles.

In another aspect, one set of encoded tiles includes Near Infrared (NIR) imagery and another set of encoded tiles includes synthetic aperture RADAR (SAR) imagery.

In a general example embodiment, a computing system is provided for processing observation data. The computing system includes a processor, memory and a communication device, and wherein: the processor is configured to obtain images and metadata associated with the images; the processor is configured to encode the images and the metadata to generate encoded tiles; the memory comprises an encoded tiles database configured to store the encoded tiles; the communication device is configured to receive a request for a map tile; the processor is configured to search the encoded tiles database and obtain the encoded tiles that are relevant to the request; the processor is configured to merge data from the encoded tiles into the map tile; and the communication device is configured to transmit the map tile.

The elements in the GUIs described or shown herein are just for examples. There may be many variations to these GUI elements without departing from the spirit of the invention. For instance, buttons, images, graphs, and other GUI controls may be displayed and operated in a differing order, or buttons, images, graphs, and other GUI controls may be added, deleted, or modified.

The steps or operations in the flow charts described herein are just for examples. There may be many variations to these steps or operations without departing from the spirit of the invention. For instance, the steps may be performed in a differing order, or steps may be added, deleted, or modified. The teachings of U.S. provisional patent application Ser. No. 61/911,914 are incorporated by reference herein, in its entirety.

Although the above has been described with reference to certain specific embodiments, various modifications thereof will be apparent to those skilled in the art as outlined in the appended claims.

The invention claimed is:

1. A method of processing geospatial data via a processing system which comprises at least one processor and at least one nontransitory processor-readable medium communicatively coupled to the at least one processor and which stores at least one of processor-executable instructions or data, the method comprising:

receiving a request for a map tile by the at least one processor, the request which specifies one or more parameters;

searching an encoded tiles repository by the at least one processor, based at least in part on the parameters specified in the received request for the map tile;

retrieving one or more encoded tiles that are relevant to the received request by the at least one processor, based at least in part on one or more parameters specified in the request;

merging data from one or more of the retrieved encoded tiles into the map tile dynamically in response to the received request by the at least one processor, wherein merging data from one or more of the retrieved encoded tiles includes merging at least one of a geospatial image at one or more respective spectral bands, one or more layer masks defining one or more areas of interest, and respective metadata for each of the spectral bands; and causing the map tile with the merged data to be provided in response to the received request for the map tile by the at least one processor, wherein causing the map tile with the merged data to be provided includes causing an uncompressed image comprising data from one or more of the retrieved encoded tiles, and at least a portion of the respective one or more layer masks of each of the retrieved encoded tiles to be provided.

2. The method of claim 1, further comprising:
receiving a plurality of geospatial data and metadata associated with the plurality of geospatial data by the at least one processor;
encoding the plurality of geospatial data and the metadata to generate a first instance of each of the one or more encoded tiles by the at least one processor;
storing the first instance of each of the one or more encoded tiles in the encoded tiles repository by the at least one processor; and
dynamically updating the metadata or generating additional metadata for the first instance of at least one of the encoded tiles to generate a second instance of the at least one of the encoded tiles by the at least one processor.

3. The method of claim 2 wherein encoding the plurality of geospatial data and the metadata as encoded tiles comprises generating a number of full resolution encoded tiles, a number of reduced resolution encoded tiles, and at least one set of updated scene metadata, each of the encoded tiles having a respective geolocation reference associated therewith.

4. The method of claim 2 wherein encoding the plurality of geospatial data and the metadata as one or more encoded tiles comprises dividing each of a number of geospatial images into one or more encoded tiles, each of the one or more encoded tiles is N by M pixels in size, where N and M are positive integers.

5. The method of claim 2 wherein encoding the plurality of geospatial data and the metadata as one or more encoded tiles includes encoding at least one of: a set of sensor data associated with a sensor that captured one or more geospatial images, a set of season data representative of a season during which one or more geospatial images were captured, a local time of day during which one or more geospatial images were captured, a set of sun angle data associated with a time and a location at which one or more geospatial images were captured, a set of cloud cover percentage data representative of an amount of cloud coverage within one or more geospatial images, a set of snow cover percentage data representative of an amount of snow coverage within one or more geospatial images, a set of water cover percentage data representative of an amount of water coverage within one or more geospatial images, and a set of land cover percentage data representative of an amount of land coverage within one or more geospatial images.

6. The method of claim 2 wherein storing the first instance of each of the one or more encoded tiles in the encoded tiles repository includes caching the encoded tiles in at least one cache memory.

7. The method of claim 1 wherein receiving a request for a map tile includes receiving a request that comprises at least one of:
x, y, z coordinates, the z coordinate represented of a zoom level, the x coordinate representative of a horizontal location coordinate relative to the zoom level, and the y coordinate representative of a vertical location coordinate relative to the zoom level;

a layer specification, the layer specification representative of one or more types of data to be represented in the map tile; and
at least one constraint on a set of geospatial data or associated metadata to be merged into the map tile.

8. The method of claim 1, further comprising:
after retrieving the encoded tiles from the encoded tiles repository, extracting one or more regions of the encoded tiles to be merged into the map tile.

9. The method of claim 1, further comprising:
after retrieving the encoded tiles from the encoded tiles repository, performing at least one manipulation on the data of at least one of the encoded tiles before or as part of merging data from one or more of the retrieved encoded tiles into the map tile.

10. The method of claim 9 wherein performing at least one manipulation on the data of at least one of the encoded tiles includes normalizing encoded tiles comprising imagery from more than one sensor prior to merging data from one or more of the retrieved encoded tiles into the map tile.

11. The method of claim 1 further comprising caching the map tile in at least one cache memory.

12. A system to electronically distribute geospatial data via a network, the system comprising:
an interface to at least one client device;
at least one processor; and
at least one nontransitory processor-readable medium communicatively coupled to the at least one processor and which stores at least one of processor-executable instructions or data, the at least one processor which:
receives a request for a map tile, the request which specifies one or more parameters;
searches an encoded tiles repository based at least in part on the parameters specified in the received request for the map tile;
retrieves one or more encoded tiles that are relevant to the received request based at least in part on one or more parameters specified in the request;
merges data from one or more of the retrieved encoded tiles into the map tile dynamically in response to the received request, wherein merging data from one or more of the retrieved encoded tiles includes merging at least one of a geospatial image at one or more respective spectral bands, one or more layer masks defining one or more areas of interest, and respective metadata for each of the spectral bands;
causes the map tile with the merged data to be provided in response to the received request for the map tile, wherein causing the map tile with the merged data to be provided includes causing an uncompressed image comprising data from one or more of the retrieved encoded tiles, and at least a portion of the respective one or more layer masks of each of the retrieved encoded tiles to be provided; and
provides the map tile to the at least one client device via the interface.

13. The system of claim 12 wherein the at least one processor:
receives a plurality of geospatial data and metadata associated with the plurality of geospatial data;
encodes the plurality of geospatial data and the metadata to generate a first instance of each of the one or more encoded tiles;
stores the first instance of each of the one or more encoded tiles in the encoded tiles repository; and
dynamically updates the metadata or generates additional metadata for a first instance of at least one of the encoded tiles to generate a second instance of the at least one of the encoded tiles.

14. The system of claim 13 wherein the plurality of geospatial data includes Earth observation data, the system further comprising:
an Earth observation data repository communicatively coupled to the at least one processor and which stores the Earth observation data in nontransitory processor-readable media.

15. The system of claim 12, further comprising:
an orthorectified imagery repository communicatively coupled to the at least one processor and which stores orthorectified imagery data in nontransitory processor-readable media.

16. The system of claim 12, further comprising:
a cache memory communicatively coupled to the at least one processor and which is configured to store at least one map tile.

17. The system of claim 12, further comprising:
a scene catalog repository communicatively coupled to the at least one processor and which stores metadata in nontransitory processor-readable media, wherein at least some of the metadata includes a location of the one or more encoded tiles in the encoded title repository.

18. The system of claim 12, further comprising:
a content delivery network for caching map tiles in closer proximity to the client device relative to the at least one processor.

19. A method of processing geospatial data via a processing system which comprises at least one processor and at least one nontransitory processor-readable medium communicatively coupled to the at least one processor and which stores at least one of processor-executable instructions or data, the method comprising:
receiving a first request for a first map tile by the at least one processor;
receiving a second request for a second map tile by the at least one processor;
receiving a third request for a third map tile by the at least one processor, each of the first, the second, and the third requests comprising one or more parameters;
determining whether the first map tile can be retrieved from a cache memory by the at least one processor;
determining whether the second map tile can be retrieved from the cache memory by the at least one processor;
determining whether the third map tile can be retrieved from the cache memory by the at least one processor;
determining whether the second map tile can be retrieved from a map tile database by the at least one processor;
determining whether the third map tile can be retrieved from the map tile database by the at least one processor;
upon determining the first map tile can be retrieved from the cache memory, retrieving the first map tile from the cache memory by the at least one processor;
upon determining the second map tile cannot be retrieved from the cache memory and can be retrieved from the map tile database, retrieving the second map tile from the map tile database by the at least one processor;
upon determining the third map tile cannot be retrieved from the cache memory and cannot be retrieved from the map tile database:
searching an encoded tiles repository by at least one component of the processing system based at least in part on the one or more parameters specified in the third request;
retrieving or generating one or more encoded tiles that are relevant to the third request based at least in part on the one or more parameters specified in the third request by the at least one processor
merging data from one or more of the retrieved encoded tiles into the third map tile dynamically by the at least one processor in response to the third request; and
causing the third map tile with the merged data to be provided in response to the third request by the at least one processor, wherein each of the retrieved encoded tiles comprises at least one geospatial image at one or more respective spectral bands, one or more layer masks defining one or more areas of interest, and respective metadata for each of the spectral bands, and the third map tile comprises an uncompressed image comprising data from one or more of the retrieved encoded tiles, and at least a portion of the respective one or more layer masks of each of the retrieved encoded tiles.

20. The method of claim 19, further comprising causing the third map tile to be stored in the cache memory.

* * * * *